United States Patent
Diankov et al.

(10) Patent No.: US 12,065,318 B2
(45) Date of Patent: Aug. 20, 2024

(54) ROBOTIC SYSTEM WITH PACKING MECHANISM

(71) Applicant: MUJIN, Inc., Tokyo (JP)

(72) Inventors: Rosen Nikolaev Diankov, Tokyo (JP); Denys Kanunikov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

(21) Appl. No.: 17/710,750

(22) Filed: Mar. 31, 2022

(65) Prior Publication Data
US 2022/0219916 A1 Jul. 14, 2022

Related U.S. Application Data

(63) Continuation of application No. 15/931,530, filed on May 13, 2020, now Pat. No. 11,319,166, which is a continuation of application No. 16/428,645, filed on May 31, 2019, now Pat. No. 10,696,493.

(51) Int. Cl.
| | | |
|---|---|---|
| G06F 7/00 | (2006.01) | |
| B65B 57/00 | (2006.01) | |
| B65G 47/90 | (2006.01) | |

(52) U.S. Cl.
CPC ............ B65G 47/905 (2013.01); B65B 57/00 (2013.01)

(58) Field of Classification Search
CPC .... B65G 47/905; B65G 1/0485; B65G 57/00; B65G 61/00; B65G 57/03; B65G 57/22; B65G 2814/0305; B65B 57/00; B65B 35/50; B65B 57/14; B25J 9/1687; B25J 9/161; B25J 9/1661; B25J 9/1664; B25J 9/1676; B25J 9/1694

USPC .................................................. 700/216–217
See application file for complete search history.

(56) References Cited

U.S. PATENT DOCUMENTS

| | | | |
|---|---|---|---|
| 3,586,176 | A | 6/1971 | Rackman et al. |
| 4,641,271 | A | 2/1987 | Konishi et al. |
| 4,676,050 | A | 6/1987 | Odenthal |
| 4,692,876 | A | 9/1987 | Tenma et al. |
| 5,079,699 | A | 1/1992 | Tuy et al. |
| 5,175,692 | A | 12/1992 | Mazouz et al. |
| 5,501,571 | A | 3/1996 | Van Durrett et al. |
| 5,908,283 | A | 6/1999 | Huang et al. |

(Continued)

FOREIGN PATENT DOCUMENTS

| | | |
|---|---|---|
| CA | 2472434 A1 | 10/2005 |
| CN | 1277591 | 12/2000 |

(Continued)

OTHER PUBLICATIONS

Non-Final Office Action mailed Jul. 25, 2019 for U.S. Appl. No. 16/428,645, filed May 31, 2019, 8 pages.

(Continued)

*Primary Examiner* — Yolanda R Cumbess
(74) *Attorney, Agent, or Firm* — Perkins Coie LLP

(57) ABSTRACT

A method for operating a robotic system includes determining package groupings for placing available packages on a platform; generating a two-dimensional (2D) placement plan based on discretized models representative of the available packages and the platform; generating a three-dimensional (3D) stacking plan based on the 2D placement plan; and implementing the 3D stacking plan for placing the available packages on the platform.

20 Claims, 6 Drawing Sheets

(56) References Cited

U.S. PATENT DOCUMENTS

| | | | |
|---|---|---|---|
| 6,055,462 A | 4/2000 | Sato | |
| 7,266,422 B1 | 9/2007 | DeMotte et al. | |
| 8,290,617 B2 | 10/2012 | Ruge | |
| 9,089,969 B1 | 7/2015 | Theobald | |
| 9,102,055 B1 | 8/2015 | Konolige et al. | |
| 9,205,558 B1 | 12/2015 | Zevenbergen et al. | |
| 9,205,562 B1 | 12/2015 | Konolige et al. | |
| 9,315,344 B1 | 4/2016 | Lehmann | |
| 9,333,649 B1 | 5/2016 | Bradski | |
| 9,393,693 B1 | 7/2016 | Kalakrishnan et al. | |
| 9,424,470 B1 | 8/2016 | Hinterstoisser | |
| 9,457,477 B1 | 10/2016 | Rublee et al. | |
| 9,457,970 B1 | 10/2016 | Zevenbergen et al. | |
| 9,688,489 B1 | 6/2017 | Zevenbergen et al. | |
| 9,714,145 B1 | 7/2017 | Lehmann | |
| 9,826,213 B1 | 11/2017 | Russell et al. | |
| 9,866,815 B2 | 1/2018 | Vrcelj et al. | |
| 9,926,138 B1 | 3/2018 | Brazeau et al. | |
| 10,019,015 B2 | 7/2018 | Johnson et al. | |
| 10,124,489 B2 | 11/2018 | Chitta et al. | |
| 10,252,870 B2 | 4/2019 | Kimoto et al. | |
| 10,335,947 B1 | 7/2019 | Diankov et al. | |
| 10,459,928 B2 | 10/2019 | Chang et al. | |
| 10,549,928 B1 | 2/2020 | Chavez et al. | |
| 10,618,172 B1 | 4/2020 | Diankov et al. | |
| 10,647,528 B1 | 5/2020 | Diankov et al. | |
| 10,679,379 B1 | 6/2020 | Diankov et al. | |
| 10,696,493 B1 | 6/2020 | Diankov et al. | |
| 10,696,494 B1 | 6/2020 | Diankov et al. | |
| 10,953,549 B2 | 3/2021 | Diankov et al. | |
| 11,077,554 B2 | 8/2021 | Arase et al. | |
| 11,173,602 B2 | 11/2021 | Ohdner et al. | |
| 11,319,166 B2 | 5/2022 | Diankov et al. | |
| 11,472,640 B2 | 10/2022 | Diankov et al. | |
| 11,488,323 B2 | 11/2022 | Diankov et al. | |
| 11,591,168 B2 | 2/2023 | Diankov et al. | |
| 2001/0041948 A1 | 12/2001 | Ross et al. | |
| 2002/0057838 A1 | 5/2002 | Steger | |
| 2003/0110102 A1 | 6/2003 | Chien et al. | |
| 2004/0074823 A1* | 4/2004 | Brust | B07C 5/10 |
| | | | 700/217 |
| 2004/0120600 A1 | 6/2004 | Cho et al. | |
| 2005/0246056 A1 | 11/2005 | Marks et al. | |
| 2008/0030497 A1 | 2/2008 | Hu et al. | |
| 2008/0131255 A1 | 6/2008 | Hessler et al. | |
| 2008/0273801 A1 | 11/2008 | Podilchuk | |
| 2009/0069939 A1 | 3/2009 | Nagatsuka et al. | |
| 2009/0138121 A1 | 5/2009 | Wicks et al. | |
| 2010/0178149 A1 | 7/2010 | Fritzsche | |
| 2010/0222915 A1 | 9/2010 | Kuehnemann et al. | |
| 2010/0249989 A1 | 9/2010 | Baldes et al. | |
| 2011/0013809 A1 | 1/2011 | Abe | |
| 2011/0122231 A1 | 5/2011 | Fujieda et al. | |
| 2013/0163879 A1 | 6/2013 | Katz et al. | |
| 2013/0282165 A1 | 10/2013 | Pankratov et al. | |
| 2013/0345870 A1 | 12/2013 | Buehler et al. | |
| 2014/0180479 A1 | 6/2014 | Argue et al. | |
| 2014/0374216 A1 | 12/2014 | Pierson et al. | |
| 2015/0073588 A1 | 3/2015 | Priebe et al. | |
| 2015/0166272 A1 | 6/2015 | Pankratov et al. | |
| 2016/0016311 A1 | 1/2016 | Konolige et al. | |
| 2016/0063309 A1 | 3/2016 | Konolige et al. | |
| 2016/0200516 A1 | 7/2016 | Baker | |
| 2016/0288330 A1 | 10/2016 | Konolige | |
| 2016/0371850 A1 | 12/2016 | Kwon et al. | |
| 2017/0039304 A1* | 2/2017 | Kim | G06Q 10/08 |
| 2017/0080566 A1 | 3/2017 | Stubbs et al. | |
| 2017/0107055 A1 | 4/2017 | Magens et al. | |
| 2017/0134680 A1 | 5/2017 | Zhong et al. | |
| 2017/0246744 A1 | 8/2017 | Chitta et al. | |
| 2017/0267467 A1 | 9/2017 | Kimoto et al. | |
| 2018/0060765 A1 | 3/2018 | Hance et al. | |
| 2018/0065818 A1 | 3/2018 | Gondoh et al. | |
| 2018/0304468 A1 | 10/2018 | Holz | |
| 2018/0312346 A1 | 11/2018 | Klotz et al. | |
| 2019/0016543 A1 | 1/2019 | Turpin et al. | |
| 2019/0039237 A1 | 2/2019 | Nakashima et al. | |
| 2019/0061151 A1 | 2/2019 | Namiki | |
| 2019/0114250 A1 | 4/2019 | Pugh | |
| 2019/0143504 A1 | 5/2019 | Kimoto | |
| 2019/0193956 A1 | 6/2019 | Morland et al. | |
| 2019/0197695 A1 | 6/2019 | Itakura | |
| 2020/0377311 A1 | 12/2020 | Diankov et al. | |
| 2020/0377312 A1 | 12/2020 | Diankov et al. | |
| 2020/0377315 A1 | 12/2020 | Diankov et al. | |
| 2020/0380722 A1 | 12/2020 | Diankov et al. | |
| 2021/0150101 A1 | 5/2021 | Liu et al. | |
| 2021/0214163 A1 | 7/2021 | Deacon et al. | |
| 2021/0237274 A1 | 8/2021 | Diankov et al. | |
| 2021/0260762 A1 | 8/2021 | Arase et al. | |
| 2023/0008946 A1 | 1/2023 | Diankov et al. | |
| 2023/0016733 A1 | 1/2023 | Diankov et al. | |
| 2023/0278811 A1 | 9/2023 | Diankov et al. | |

FOREIGN PATENT DOCUMENTS

| | | |
|---|---|---|
| CN | 101145051 A | 3/2008 |
| CN | 201804260 U | 4/2011 |
| CN | 102556523 A | 7/2012 |
| CN | 102725703 B | 10/2012 |
| CN | 103350908 A | 10/2013 |
| CN | 103640729 A | 3/2014 |
| CN | 103988214 B | 8/2014 |
| CN | 105691717 A | 6/2016 |
| CN | 107885901 A | 4/2018 |
| CN | 108064197 A | 5/2018 |
| CN | 207374734 U | 5/2018 |
| CN | 108748136 A | 11/2018 |
| CN | 108776879 A | 11/2018 |
| CN | 109132313 A | 1/2019 |
| CN | 109353833 A | 2/2019 |
| CN | 109359739 A | 2/2019 |
| CN | 109382822 | 2/2019 |
| CN | 112009810 A | 12/2020 |
| DE | 69221658 T2 | 9/1997 |
| DE | 10352279 A1 | 6/2005 |
| DE | 69730758 T2 | 9/2005 |
| DE | 102009011294 A1 | 9/2010 |
| DE | 102009011300 A1 | 9/2010 |
| DE | 102014005758 B4 | 10/2014 |
| DE | 102007001263 B4 | 7/2015 |
| DE | 102016013497 A1 | 5/2017 |
| DE | 102017105082 B4 | 9/2017 |
| DE | 102017122361 A1 | 3/2018 |
| DE | 112011105151 B4 | 9/2018 |
| DE | 102018006465 A1 | 2/2019 |
| DE | 102018008744 A1 | 5/2019 |
| EP | 0507375 A2 | 8/1997 |
| EP | 2314425 A2 | 4/2011 |
| EP | 2769341 B1 | 8/2014 |
| EP | 3104313 A1 | 12/2016 |
| EP | 3437807 A2 | 2/2019 |
| JP | S61033426 A | 2/1986 |
| JP | 62019963 A | 1/1987 |
| JP | S62251811 A | 11/1987 |
| JP | 03158322 A | 7/1991 |
| JP | 03162320 A | 7/1991 |
| JP | H03158322 A | 7/1991 |
| JP | H03162320 A | 7/1991 |
| JP | 3243528 B2 | 10/1991 |
| JP | H04201926 A | 7/1992 |
| JP | H08118274 A | 5/1996 |
| JP | 10080881 A | 3/1998 |
| JP | 2000168958 A | 6/2000 |
| JP | 2001301946 A | 10/2001 |
| JP | 2002154616 A | 5/2002 |
| JP | 2002154620 | 5/2002 |
| JP | 2003104563 A | 4/2003 |
| JP | 2003335417 A | 11/2003 |
| JP | 3586639 B2 | 11/2004 |
| JP | 2004307111 A | 11/2004 |
| JP | 2005089067 A | 7/2005 |
| JP | 2007179301 A | 7/2007 |
| JP | 2007246225 A | 9/2007 |

(56) References Cited

FOREIGN PATENT DOCUMENTS

| JP | 2007254078 A | 10/2007 |
|---|---|---|
| JP | 2007291451 A | 11/2007 |
| JP | 2014021810 A | 7/2012 |
| JP | 2013086914 A | 5/2013 |
| JP | 2014530158 A | 11/2014 |
| JP | 2017094428 A1 | 6/2017 |
| JP | 2017165517 A | 9/2017 |
| JP | 2018008824 A | 1/2018 |
| JP | 2018052691 A | 4/2018 |
| JP | 2018136896 A | 8/2018 |
| JP | 2018525301 A | 9/2018 |
| JP | 2018167950 A | 11/2018 |
| JP | 2019025618 A | 2/2019 |
| JP | 2019085213 A | 6/2019 |
| JP | 2019531908 A | 11/2019 |
| KR | 101708150 B1 | 2/2017 |
| WO | 2017018113 A1 | 2/2017 |
| WO | 2017061632 A1 | 4/2017 |
| WO | 2018194765 A1 | 10/2018 |

OTHER PUBLICATIONS

Final Office Action mailed Dec. 2, 2019 for U.S. Appl. No. 16/428,645, filed May 31, 2019, 8 pages.
Non-Final Office Action mailed Sep. 11, 2019 for U.S. Appl. No. 16/428,714, filed May 31, 2019, 30 pages.
Notice of Allowance mailed Aug. 29, 2019 for U.S. Appl. No. 16/428,809, filed May 31, 2019, 6 pages.
Notice of Allowance mailed Dec. 11, 2019 for U.S. Appl. No. 16/428,809, filed May 31, 2019, 13 pages.
Non-Final Office Action mailed Jul. 31, 2019 for U.S. Appl. No. 16/428,843, filed May 31, 2019, 15 pages.
Final Office Action mailed Dec. 2, 2019 for U.S. Appl. No. 16/428,843, filed May 31, 2019, 7 pages.
Non-Final Office Action mailed Aug. 2, 2019 for U.S. Appl. No. 16/428,870, filed May 31, 2019, 21 pages.
Notice of Allowance mailed Jan. 24, 2020 for U.S. Appl. No. 16/428,870, filed May 31, 2019, 17 pages.
Notice of Allowance mailed Mar. 11, 2020 for U.S. Appl. No. 16/428,645, filed May 31, 2019, 10 pages.
Notice of Allowance mailed Mar. 12, 2020 for U.S. Appl. No. 16/428,714, filed May 31, 2019, 30 pages.
Notice of Allowance mailed Mar. 12, 2020 for U.S. Appl. No. 16/428,843, filed May 31, 2019, 10 pages.
Non-Final Office Action mailed Sep. 15, 2020 for U.S. Appl. No. 16/802,451 filed Feb. 26, 2020, 25 pages.
Notice of Allowance mailed Jan. 12, 2021 for U.S. Appl. No. 16/886,734 filed May 28, 2020, 13 pages.
CIPO Office Action mailed Dec. 28, 2020 for Chinese patent application No. 202010221047.6, 5 pages.
JPO Office Action mailed Apr. 2, 2020 for Japanese patent application No. 2019-168905, 2 pages.
JPO Office Action mailed Mar. 12, 2020 for Japanese patent application No. 2019-170230, 2 pages.
JPO Office Action mailed Apr. 8, 2020 for Japanese patent application No. 2019-169752, 3 pages.
Notice of Allowance mailed Oct. 23, 2020 for U.S. Appl. No. 16/802,451 filed Feb. 26, 2020, 10 pages.
CIPO Notice to Grant mailed Mar. 2, 2021 for Chinese patent application No. 202010221047.6, 4 pages.
JPO Notice to Grant mailed Apr. 14, 2020 for Japanese patent application No. 2019-168905, 3 pages.
JPO Notice to Grant mailed Apr. 2, 2020 for Japanese patent application No. 2019-170230, 3 pages.
CIPO Office Action mailed Dec. 28, 2020 for Chinese patent application No. 202010221046.1, 6 pages.
CIPO Office Action mailed Mar. 1, 2021 for Chinese patent application No. 202010221046.1, 5 pages.
CIPO Office Action mailed Jan. 18, 2021 for Chinese patent application No. 202010221092.1, 9 pages.
CIPO Notice to Grant mailed Mar. 3, 2021 for Chinese patent application No. 202010221092.1, 4 pages.
JPO Notice to Grant mailed Jun. 5, 2020 for Japanese patent application No. 2019-169752, 3 pages.
Notice of Allowance mailed Feb. 9, 2021 for U.S. Appl. No. 16/802,451 filed Feb. 26, 2020, 13 pages.
CIPO Office Action mailed Jan. 5, 2021 for Chinese patent application No. 202010221015.6, 6 pages.
CIPO Notice to Grant mailed Mar. 2, 2021 for Chinese patent application No. 202010221015.6, 4 pages.
JPO Notice to Grant mailed Feb. 10, 2020 for Japanese patent application No. 2019-169842, 3 pages.
JPO Office Action mailed Jan. 21, 2020 for Japanese patent application No. 2019-169842, 5 pages.
CIPO Office Action mailed Jan. 13, 2021 for Chinese patent application No. 202010205099.4, 6 pages.
CIPO Notice to Grant mailed Feb. 20, 2021 for Chinese patent application No. 202010205099.4, 4 pages.
JPO Notice to Grant mailed Jan. 21, 2020 for Japanese patent application No. 2019-169237, 3 pages.
Non-Final Office Action mailed Sep. 28, 2020 for U.S. Appl. No. 16/886,734, filed May 28, 2020, 32 pages.
CIPO Notice to Grant mailed Apr. 2, 2021 for Chinese patent application No. 202010221046.1, 4 pages.
German Patent Office Action mailed May 4, 2020 for German patent application No. 102019130043.6, 8 pages.
German Patent Office Decision to Grant mailed Sep. 7, 2020 for German patent application No. 102019130043.6, 6 pages.
German Patent Office Action mailed Jul. 1, 2021 for German patent application No. 102019130635.3, 18 pages.
German Patent Office Decision to Grant mailed Oct. 6, 2020 for German patent application No. 1020191130902.6, 6 pages.
KIPO Office Action mailed Sep. 24, 2021 for Korean patent application No. 9-5-2021-074997218, 12 pages.
KIPO Office Action mailed Sep. 24, 2021 for Korean patent application No. 9-5-2021-075180279, 5 pages.
German Patent Office Action mailed Sep. 3, 2021 for German patent application No. 102019130639.6, 24 pages.
KIPO Office Action mailed Aug. 6, 2021 for Korean patent application No. 9-5-2021-062621061, 18 pages.
German Patent Office Action mailed Sep. 10, 2021 for German patent application No. 102019130923.9, 19 pages.
KIPO Notice of Allowance mailed Sep. 29, 2021 for Korean patent application No. 9-5-2021-076720887, 2 pages.
Corrected Notice of Allowability mailed Jun. 24, 2021 for U.S. Appl. No. 16/886,734, filed May 28, 2020, 7 pages.
KIPO Notice of Allowance mailed Sep. 5, 2021 for Korean patent application No. 9-5-2021-062620915, 2 pages.
Non-Final Office Action mailed Mar. 28, 2022 for U.S. Appl. No. 16/858,536, filed Apr. 24, 2020, 49 pages.
German Patent Office Action mailed Dec. 6, 2021 for German patent application No. 102019009189.2, 6 pages.
KIPO Notice of Allowance mailed Mar. 23, 2022 for Korean patent application No. 9-5-2022-022045553, 4 pages.
KIPO Notice of Allowance mailed Mar. 29, 2022 for Korean patent application No. 9-5-2022-023805806, 4 pages.
Non-Final Office Action mailed Jan. 19, 2022 for U.S. Appl. No. 16/804,853, filed Feb. 28, 2020, 51 pages.
German Patent Office Action mailed Mar. 9, 2022 for German patent application No. 102019009206.6, 6 pages.
KIPO Notice of Allowance mailed Apr. 27, 2022 for Korean patent application No. 9-5-2022-022045553, 9 pages.
German Patent Decision to Grant mailed Apr. 20, 2022 for German patent application No. 102019009189.2, 7 pages.
Notice of Allowance mailed May 16, 2022 for U.S. Appl. No. 16/804,853, filed Feb. 28, 2020, 55 pages.
German Patent Office Decision to Grant mailed Jul. 1, 2022 for German patent application No. 102019009206.6, 7 pages.
Notice of Allowance mailed Jun. 28, 2022 for U.S. Appl. No. 16/858,536, filed Apr. 24, 2020, 16 pages.
Non-Final Office Action mailed Sep. 8, 2022 for U.S. Appl. No. 17/152,723, filed Jan. 19, 2021, 52 pages.

(56) References Cited

OTHER PUBLICATIONS

Notice of Allowance mailed Oct. 6, 2022 for U.S. Appl. No. 16/874,587, filed May 14, 2020, 46 pages.
German Patent Office Decision to Grant mailed Sep. 19, 2022 for German patent application No. 102019130923.9, 5 pages.
German Patent Office Decision to Grant mailed Mar. 24, 2023 for German patent application No. 102019130639.6, 10 pages.
Non-Final Office Action mailed Mar. 16, 2023 for U.S. Appl. No. 17/318,962, filed May 12, 2021, 34 pages.
JPO Office Action mailed Jul. 5, 2023 for Japanese patent application No. 2020-076751, 2 pages.
KIPO Office Action mailed Aug. 24, 2023 for Korean patent application No. 10-2021-0150469, 5 pages.
JPO Office Action mailed Jul. 3, 2023 for Japanese patent application No. 2020-072970, 6 pages.
JPO Office Action mailed Jun. 12, 2023 for Japanese patent application No. 2020-111103, 6 pages.
USPTO Final Office Action mailed Feb. 7, 2023 for U.S. Appl. No. 17/152,723 filed Jan. 19, 2021, 28 pages.
USPTO Notice of Allowance mailed Jun. 14, 2023 for U.S. Appl. No. 17/152,723, filed Jan. 19, 2021, 16 pages.
JPO Office Action mailed Aug. 2, 2023 for Japanese patent application No. 2020-041743, 5 pages.
KIPO Office Action mailed Aug. 24, 2023 for Korean patent application No. 10-2022-0059391, 7 pages.
JPO Office Action mailed Jun. 12, 2023 for Japanese patent application No. 2020-025844, 3 pages.
KIPO Notice of Allowance mailed Sep. 22, 2023 for Korean patent application No. 10-2021-0163408, 4 pages.
Notice of Allowance mailed Jul. 10, 2023 for U.S. Appl. No. 17/318,962, filed May 12, 2021, 15 pages.
Non-Final Office Action mailed Oct. 19, 2023 for U.S. Appl. No. 17/949,092, filed Sep. 20, 2022, 22 pages.
JPO Notice of Reasons for Refusal mailed Dec. 15, 2023 for Application No. 2020-016803, 6 pages.
KIPO Office Action mailed Feb. 15, 2024 for Korean patent application No. 10-2021-0150469, 4 pages.
JPO Decision to Grant mailed Jan. 30, 2024 for Japanese patent application No. 2020-076751, 2 pages.
KIPO Office Action mailed Jan. 19, 2024 for Korean patent application No. 10-2022-0088338, 6 pages.
JPO Office Action mailed Dec. 1, 2023 for Japanese patent application No. 2020-072970, 4 pages.
KIPO Office Action mailed Jan. 19, 2024 for Korean patent application No. 10-2022-0068061, 8 pages.
JPO Office Action mailed Jan. 5, 2024 for Japanese patent application No. 2020-111103, 4 pages.
JPO Decision to Grant mailed Dec. 25, 2023 for Japanese patent application No. 2020-041743, 5 pages.
KIPO Office Action mailed Feb. 19, 2024 for Korean patent application No. 10-2022-0059391, 3 pages.
Notice of Allowance mailed Jan. 31, 2024 for U.S. Appl. No. 17/949,092, filed Sep. 20, 2022, 14 pages.
Final Office Action mailed Feb. 21, 2024 for U.S. Appl. No. 17/318,962, filed May 12, 2021, 14 pages.
German Patent Office Decision to Grant mailed Oct. 17, 2023 for German patent application No. 102019130635.3, 1 page.
JPO Office Action mailed Mar. 13, 2024 for Japanese patent application No. 2020-072970, 4 pages.
JPO Decision to Grant mailed Nov. 29, 2023 for Japanese patent application No. 2020-025844, 3 pages.
JPO Office Action mailed Mar. 8, 2024 for Japanese patent application No. 2020-072970, 4 pages.

\* cited by examiner

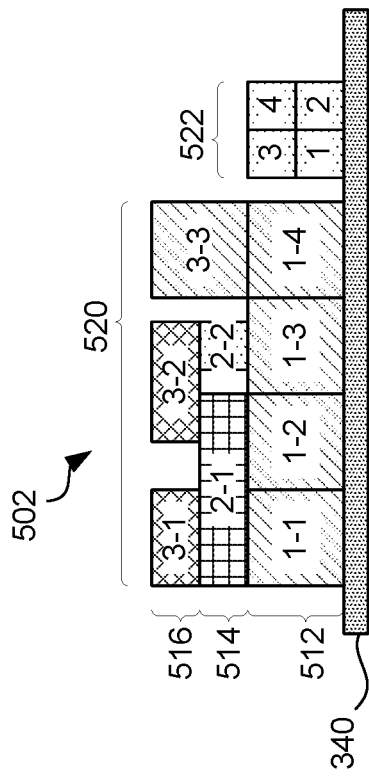
FIG. 5A
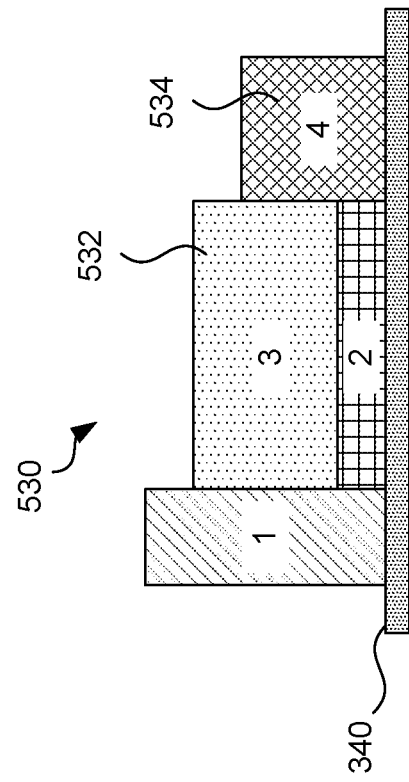
FIG. 5B
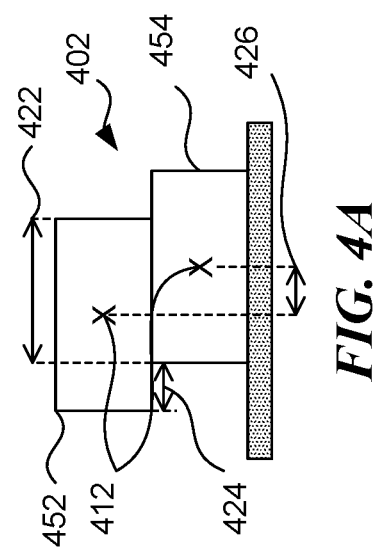
FIG. 4A
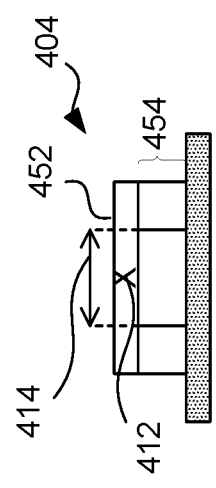
FIG. 4B
FIG. 4C

ROBOTIC SYSTEM WITH PACKING MECHANISM

CROSS-REFERENCE TO RELATED APPLICATION(S)

This application is a continuation of U.S. patent application Ser. No. 15/931,530, filed May 13, 2020, issued as U.S. Pat. No. 11,319,166, which is a continuation of U.S. patent application Ser. No. 16/428,645, filed May 31, 2019, issued as U.S. Pat. No. 10,696,493, both of which are incorporated by reference herein in their entirety.

This application contains subject matter related to U.S. patent application Ser. No. 16/428,714, filed May 31, 2019, issued as U.S. Pat. No. 10,679,379, titled "A ROBOTIC SYSTEM WITH DYNAMIC PACKING MECHANISM," and is incorporated herein by reference in its entirety.

This application contains subject matter related to U.S. patent application Ser. No. 16/428,809, filed May 31, 2019, issued as U.S. Pat. No. 10,618,172, titled "A ROBOTIC SYSTEM WITH ERROR DETECTION AND DYNAMIC PACKING MECHANISM," and is incorporated herein by reference in its entirety.

This application contains subject matter related U.S. patent application Ser. No. 16/428,843, filed May 31, 2019, issued as U.S. Pat. No. 10,696,494, titled "ROBOTIC SYSTEM FOR PROCESSING PACKAGES ARRIVING OUT OF SEQUENCE," and is incorporated herein by reference in its entirety.

This application contains subject matter related to U.S. patent application Ser. No. 16/428,870, filed May 31, 2019, issued as U.S. Pat. No. 10,647,528, titled "ROBOTIC SYSTEM FOR PALLETIZING PACKAGES USING REAL-TIME PLACEMENT SIMULATION," and is incorporated herein by reference in its entirety.

TECHNICAL FIELD

The present technology is directed generally to robotic systems and, more specifically, to systems, processes, and techniques for packing objects.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing the human involvement that would otherwise be required to perform dangerous or repetitive tasks.

However, despite the technological advancements, robots often lack the sophistication necessary to duplicate human sensitivity and/or adaptability required for executing more complex tasks. For example, robots often lack the granularity of control and flexibility in the executed actions to account for deviations or uncertainties that may result from various real-world factors. Accordingly, there remains a need for improved techniques and systems for controlling and managing various aspects of the robots to complete the tasks despite the various real-world factors.

BRIEF DESCRIPTION OF THE DRAWINGS

FIGS. 4A-4C are illustrations of stacking rules in accordance with one or more embodiments of the present technology.

FIG. 5A is an illustration of an example stacking plan in accordance with one or more embodiments of the present technology.

FIG. 5B is an illustration of a stacking sequence in accordance with one or more embodiments of the present technology.

DETAILED DESCRIPTION

Figure 1:
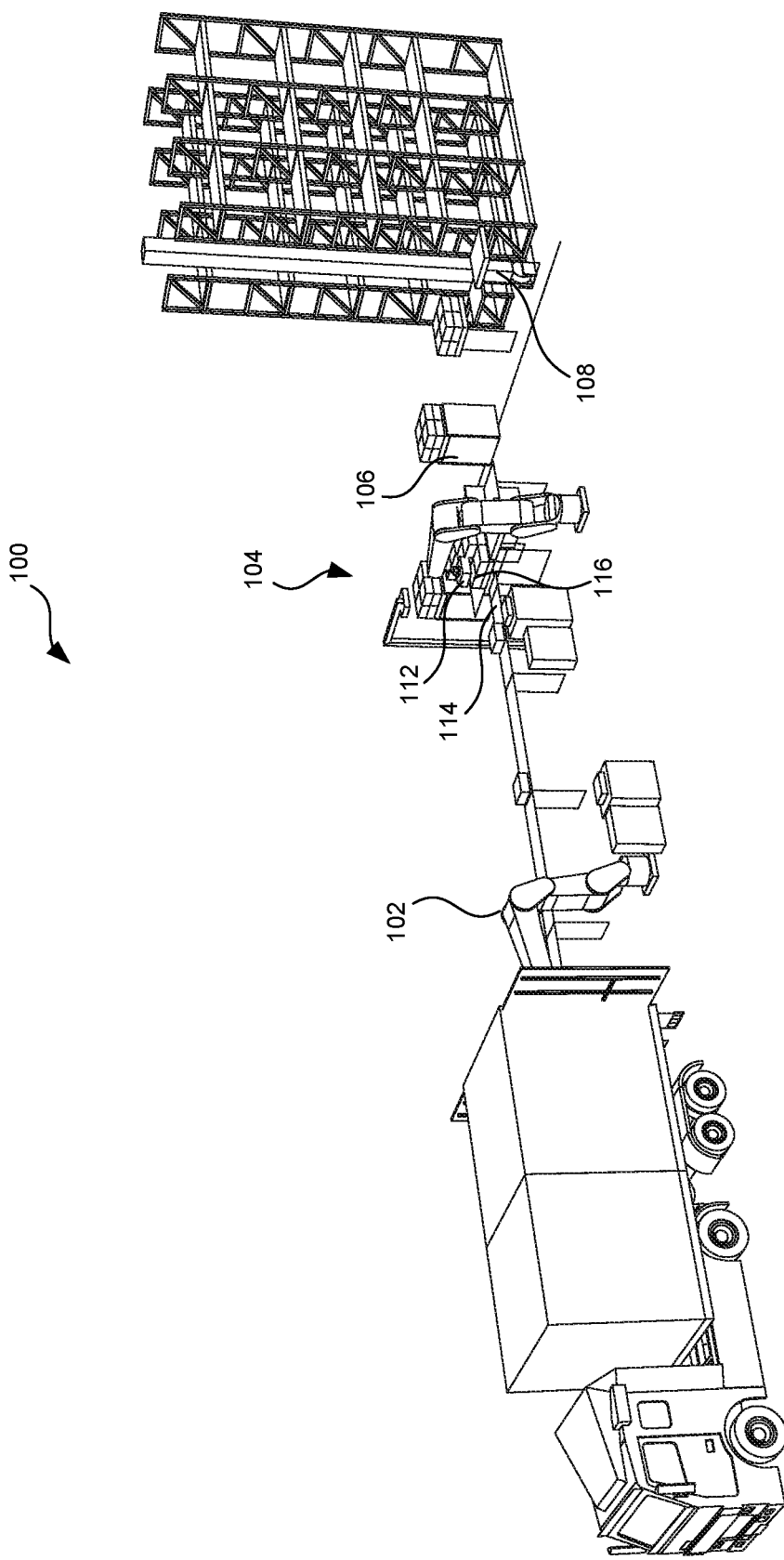
FIG. 1 is an illustration of an example environment in which a robotic system with a 3-dimensional packing mechanism may operate.

Systems and methods for robotic systems with packing mechanisms are described herein. A robotic system (e.g., an integrated system of devices that executes one or more designated tasks) configured in accordance with some embodiments provides enhanced packing and storage efficiency by deriving optimal storage locations for objects and stacking them accordingly.

Traditional systems use offline packing simulators to predetermine packing sequences/arrangements. The traditional packing simulators process object information (e.g., case shapes/sizes) for a predetermined or estimated set of cases to generate packing plans. Once determined, the packing plans dictate and/or require specific placement locations/poses of the objects at destinations (e.g., pallets, bins, cages, boxes, etc.), predefined sequences for the placement, and/or predetermined motion plans. From the predetermined packing plans, the traditional packing simulators may derive source requirements (e.g., sequences and/or placements for the objects) that match or enable the packing plans. Because the packing plans are developed offline in traditional systems, the plans are independent of actual packing operations/conditions, object arrivals, and/or other system implementations. Accordingly, the overall operation/implementation will require the received packages (e.g., at the starting/pick up location) to follow fixed sequences that matches the predetermined packing plans. As such, traditional systems cannot adapt to real-time conditions and/or deviations in the received packages (e.g., different sequence, location, and/or orientation), unanticipated errors (e.g., collisions and/or lost pieces), real-time packing requirements (e.g., received orders), and/or other real-time factors.

Further, because traditional systems group and pack objects according to rigid predetermined plans/sequences, they require all objects at a source location to either (1) have a same dimension/type and/or (2) arrive according to a known sequence. For example, the traditional systems would require the objects to arrive (via, e.g., conveyor) at a pickup location according to a fixed sequence. Also, for example, the traditional systems would require the objects at the pickup location to be placed at designated locations according to a predetermined pose. As such, traditional systems require one or more operations to order and/or place the objects at the source (i.e., before the packing operation) according to the predetermined sequence/arrangement. Often, the traditional systems require a sequence buffer, which costs upwards of one million US dollars, to order and/or place the objects at the source according to the predetermined sequence/pose.

In contrast, the robotic system described herein can generate the packing plans during system operation. The robotic system can generate a real-time and/or dynamic packing plan during the system operation based on various real-time conditions. Real-time conditions can include currently existing or ongoing conditions, such as actual source sequences/locations/poses of objects, object conditions and/or requirements, placement requirements, and/or other real-time factors. The robotic system can generate the packing plans in real-time, such as in response to a triggering event (e.g., a received order/request, a shipping schedule, and/or an operator input), according to current/ongoing conditions and factors at the time of the packing plan processing. In some embodiments, the packing plans can be dynamically (e.g., after initially starting one or more operations, such as the actual packing operation, begins) generated and/or adjusted, such as in response to a corresponding event (e.g., a re-evaluation timing, a packing/manipulation error, such as a collision or a lost piece, and/or occurrence of other dynamic conditions).

Unlike the traditional systems, the robotic system described herein can generate the placement plans in real-time according to current/live conditions (e.g., source sequences/locations/poses of objects, object conditions and/or requirements, etc.). In some embodiments, the robotic system can generate the packing plan based on a discretization mechanism (e.g., a process, a circuit, a function, and/or a routine). For example, the robotic system can use the discretization mechanism to describe physical sizes/shapes of objects and/or target locations according to a discretization unit (i.e., one discrete area/space). The robotic system can generate discretized object profiles that use the discretization units to describe the expected objects and/or discretized destination profiles that describe the target location (e.g., surface on top of the pallet and/or a space/bottom surface inside a bin/case/box). Accordingly, the robotic system can transform continuous real-world space/area into computer-readable digital information. Further, the discretized data can allow a reduction in computational complexity for describing package footprint and for comparing various package placements. For example, package dimensions can correspond to integer numbers of discretization units, which lead to easier mathematical computations, instead of real-world decimal number.

In some embodiments, the robotic system can generate the packing plan based on determining object groupings. The object groupings can be based on object descriptions, such as customer-specified priorities, object fragility measure (e.g., support weight limitations), object weight, object height, object type, and/or other aspects of the objects. The robotic system can use the object groupings to generate and evaluate 2-dimensional (2D) placement plans that include one or more object groupings. The robotic system can select the 2D placement plans that satisfy one or more conditions/rules and translate the selected 2D placement plans into three-dimensional (3D) mapping results. The 3D mapping results can describe the heights of the 2D placement plans, such as according to height measurements of the objects included in the 2D placement plans and their relative locations within the layer. The robotic system can evaluate the 3D mapping results to vertically order/sequence to generate the 3D placement plans that include the vertical sequence for the 2D placement plans. In some embodiments, the robotic system can generate the 2D/3D placement plans for objects in an initial state (e.g., before any objects are placed at the destination zone) and/or for objects remaining in a non-packed state (e.g., after one or more objects have been placed at the destination zone). Details regarding the object grouping and the placement plans are described below.

The robotic system described below can utilize simplified and stream-lined processing architecture/sequence for real-time implementation. For example, the robotic system (via, e.g., a consumer computing device, such as a desk top, a server, etc.) can generate the packing plan based on real-time need (e.g., received order) and/or real-time availability (e.g., shipping manifesto of incoming objects and/or currently accessible objects) without utilizing the traditional sequencer and simulator. When utilized in an offline context, such as to replace the traditional sequencers and simulators, the robotic system can provide the offline packing plans using a simpler and cheaper solution.

Accordingly, the robotic system can improve efficiency, speed, and accuracy for packing the objects based on adapting to the real-time conditions. For example, the system described herein can generate the placement plans that match/address the currently need (e.g., received orders), the current status (e.g., location, orientation, and/or quantity/availability) of packages, and/or the real-time status of previously stacked/placed packages. As such, the robotic system can receive and pack packages that are in various different/unexpected quantities, locations, orientations, and/or sequences.

Further, the robotic system can reduce overall costs by eliminating the one or more operations, machines (e.g., sequence buffers), and/or human assistance that would be necessary in traditional systems to order or place the objects at the source and/or for the packing operation (e.g., for error handling). By generating the packing plan according to the existing package states (e.g., quantity, location, and/or orientation), the robotic system eliminates the need to reorganize or sequence the packages, along with the associated machines/human operations, to meet the requirements of traditional systems.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer- or processor-executable instructions, including routines executed by a programmable computer or processor. Those skilled in the relevant art will appreciate that the disclosed techniques can be practiced on computer or processor systems other than those shown and described below. The techniques described herein can be embodied in a special-purpose computer or data processor that is specifically programmed, configured, or constructed to execute one or more of the computer-executable instructions described below. Accordingly, the terms "computer" and "processor" as generally used herein refer to any data processor and can include Internet appliances and handheld devices (including palm-top computers, wearable computers, cellular or mobile phones, multi-processor systems, processor-based or programmable consumer electronics, network computers, mini computers, and the like). Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both.

Suitable Environments

FIG. 1 is an illustration of an example environment in which a robotic system 100 with a packing mechanism may operate. The robotic system 100 can include and/or communicate with one or more units (e.g., robots) configured to execute one or more tasks. Aspects of the packing mechanism can be practiced or implemented by the various units.

For the example illustrated in FIG. 1, the robotic system 100 can include an unloading unit 102, a transfer unit 104 (e.g., a palletizing robot and/or a piece-picker robot), a transport unit 106, a loading unit 108, or a combination thereof in a warehouse or a distribution/shipping hub. Each of the units in the robotic system 100 can be configured to execute one or more tasks. The tasks can be combined in sequence to perform an operation that achieves a goal, such as to unload objects from a truck or a van and store them in a warehouse or to unload objects from storage locations and prepare them for shipping. For another example, the task can include placing the objects on a target location (e.g., on top of a pallet and/or inside a bin/cage/box/case). As described below, the robotic system can derive plans (e.g., placement locations/orientations, sequence for transferring the objects, and/or corresponding motion plans) for placing and/or stacking the objects. Each of the units can be configured to execute a sequence of actions (e.g., operating one or more components therein) to execute a task.

In some embodiments, the task can include manipulation (e.g., moving and/or reorienting) of a target object 112 (e.g., one of the packages, boxes, cases, cages, pallets, etc. corresponding to the executing task) from a start location 114 to a task location 116. For example, the unloading unit 102 (e.g., a devanning robot) can be configured to transfer the target object 112 from a location in a carrier (e.g., a truck) to a location on a conveyor belt. Also, the transfer unit 104 can be configured to transfer the target object 112 from one location (e.g., the conveyor belt, a pallet, or a bin) to another location (e.g., a pallet, a bin, etc.). For another example, the transfer unit 104 (e.g., a palletizing robot) can be configured to transfer the target object 112 from a source location (e.g., a pallet, a pickup area, and/or a conveyor) to a destination pallet. In completing the operation, the transport unit 106 can transfer the target object 112 from an area associated with the transfer unit 104 to an area associated with the loading unit 108, and the loading unit 108 can transfer the target object 112 (by, e.g., moving the pallet carrying the target object 112) from the transfer unit 104 to a storage location (e.g., a location on the shelves). Details regarding the task and the associated actions are described below.

For illustrative purposes, the robotic system 100 is described in the context of a shipping center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as manipulators, service robots, modular robots, etc., not shown in FIG. 1. For example, in some embodiments, the robotic system 100 can include a depalletizing unit for transferring the objects from cage carts or pallets onto conveyors or other pallets, a container-switching unit for transferring the objects from one container to another, a packaging unit for wrapping the objects, a sorting unit for grouping objects according to one or more characteristics thereof, a piece-picking unit for manipulating (e.g., for sorting, grouping, and/or transferring) the objects differently according to one or more characteristics thereof, or a combination thereof.

Suitable System

Figure 2:
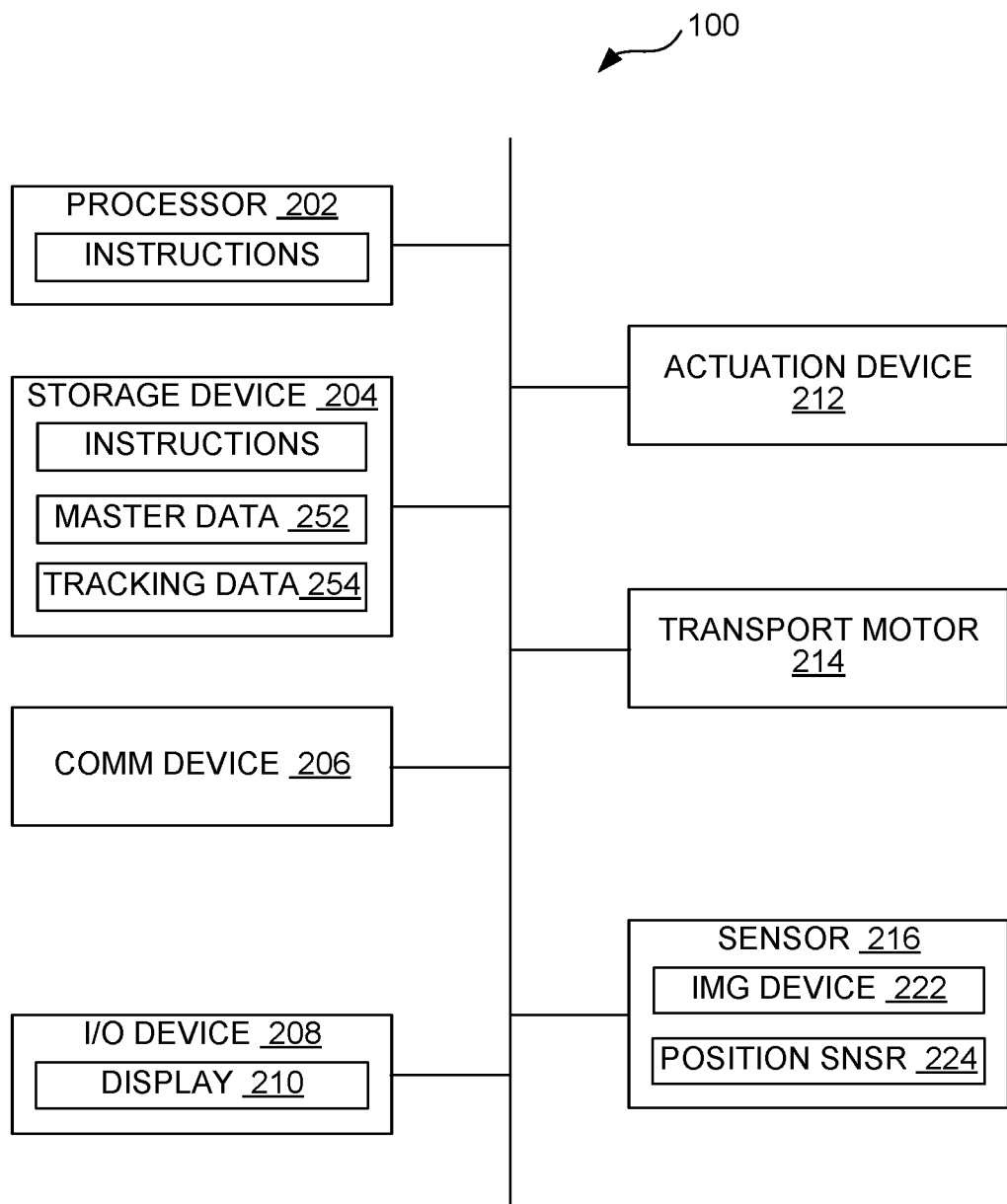
FIG. 2 is a block diagram illustrating the robotic system in accordance with one or more embodiments of the present technology.

FIG. 2 is a block diagram illustrating the robotic system 100 in accordance with one or more embodiments of the present technology. In some embodiments, for example, the robotic system 100 (e.g., at one or more of the units and/or robots described above) can include electronic/electrical devices, such as one or more processors 202, one or more storage devices 204, one or more communication devices 206, one or more input-output devices 208, one or more actuation devices 212, one or more transport motors 214, one or more sensors 216, or a combination thereof. The various devices can be coupled to each other via wire connections and/or wireless connections. For example, the robotic system 100 can include a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Also, for example, the robotic system 100 can include bridges, adapters, processors, or other signal-related devices for providing the wire connections between the devices. The wireless connections can be based on, for example, cellular communication protocols (e.g., 3G, 4G, LTE, 5G, etc.), wireless local area network (LAN) protocols (e.g., wireless fidelity (WIFI)), peer-to-peer or device-to-device communication protocols (e.g., Bluetooth, Near-Field communication (NFC), etc.), Internet of Things (IoT) protocols (e.g., NB-IoT, LTE-M, etc.), and/or other wireless communication protocols.

The processors 202 can include data processors (e.g., central processing units (CPUs), special-purpose computers, and/or onboard servers) configured to execute instructions (e.g. software instructions) stored on the storage devices 204 (e.g., computer memory). In some embodiments, the processors 202 can be included in a separate/stand-alone controller that is operably coupled to the other electronic/electrical devices illustrated in FIG. 2 and/or the robotic units illustrated in FIG. 1. The processors 202 can implement the program instructions to control/interface with other devices, thereby causing the robotic system 100 to execute actions, tasks, and/or operations.

The storage devices 204 can include non-transitory computer-readable mediums having stored thereon program instructions (e.g., software). Some examples of the storage devices 204 can include volatile memory (e.g., cache and/or random-access memory (RAM)) and/or non-volatile memory (e.g., flash memory and/or magnetic disk drives). Other examples of the storage devices 204 can include portable memory drives and/or cloud storage devices.

In some embodiments, the storage devices 204 can be used to further store and provide access to processing results and/or predetermined data/thresholds. For example, the storage devices 204 can store master data 252 that includes descriptions of objects (e.g., boxes, cases, and/or products) that may be manipulated by the robotic system 100. In one or more embodiments, the master data 252 can include a dimension, a shape (e.g., templates for potential poses and/or computer-generated models for recognizing the object in different poses), a color scheme, an image, identification information (e.g., bar codes, quick response (QR) codes, logos, etc., and/or expected locations thereof), an expected weight, other physical/visual characteristics, or a combination thereof for the objects expected to be manipulated by the robotic system 100. In some embodiments, the master data 252 can include manipulation-related information regarding the objects, such as a center-of-mass (CoM) location on each of the objects, expected sensor measurements (e.g., for force, torque, pressure, and/or contact measurements) corresponding to one or more actions/maneuvers, or a combination thereof. Also, for example, the storage devices 204 can store object tracking data 254. In some embodiments, the object tracking data 254 can include a log of scanned or manipulated objects. In some embodiments, the object tracking data 254 can include imaging data (e.g., a picture, point cloud, live video feed, etc.) of the objects at one or more locations (e.g., designated pickup or drop locations and/or conveyor belts). In some embodiments, the object tracking data 254 can include locations and/or orientations of the objects at the one or more locations.

The communication devices 206 can include circuits configured to communicate with external or remote devices via a network. For example, the communication devices 206 can include receivers, transmitters, modulators/demodulators (modems), signal detectors, signal encoders/decoders, connector ports, network cards, etc. The communication devices 206 can be configured to send, receive, and/or process electrical signals according to one or more communication protocols (e.g., the Internet Protocol (IP), wireless communication protocols, etc.). In some embodiments, the robotic system 100 can use the communication devices 206 to exchange information between units of the robotic system 100 and/or exchange information (e.g., for reporting, data gathering, analyzing, and/or troubleshooting purposes) with systems or devices external to the robotic system 100.

The input-output devices 208 can include user interface devices configured to communicate information to and/or receive information from human operators. For example, the input-output devices 208 can include a display 210 and/or other output devices (e.g., a speaker, a haptics circuit, or a tactile feedback device, etc.) for communicating information to the human operator. Also, the input-output devices 208 can include control or receiving devices, such as a keyboard, a mouse, a touchscreen, a microphone, a user interface (UI) sensor (e.g., a camera for receiving motion commands), a wearable input device, etc. In some embodiments, the robotic system 100 can use the input-output devices 208 to interact with the human operators in executing an action, a task, an operation, or a combination thereof.

The robotic system 100 can include physical or structural members (e.g., robotic manipulator arms) that are connected at joints for motion (e.g., rotational and/or translational displacements). The structural members and the joints can form a kinetic chain configured to manipulate an end-effector (e.g., the gripper) configured to execute one or more tasks (e.g., gripping, spinning, welding, etc.) depending on the use/operation of the robotic system 100. The robotic system 100 can include the actuation devices 212 (e.g., motors, actuators, wires, artificial muscles, electroactive polymers, etc.) configured to drive or manipulate (e.g., displace and/or reorient) the structural members about or at a corresponding joint. In some embodiments, the robotic system 100 can include the transport motors 214 configured to transport the corresponding units/chassis from place to place.

The robotic system 100 can include the sensors 216 configured to obtain information used to implement the tasks, such as for manipulating the structural members and/or for transporting the robotic units. The sensors 216 can include devices configured to detect or measure one or more physical properties of the robotic system 100 (e.g., a state, a condition, and/or a location of one or more structural members/joints thereof) and/or of a surrounding environment. Some examples of the sensors 216 can include accelerometers, gyroscopes, force sensors, strain gauges, tactile sensors, torque sensors, position encoders, etc.

In some embodiments, for example, the sensors 216 can include one or more imaging devices 222 (e.g., visual and/or infrared cameras, 2D and/or 3D imaging cameras, distance measuring devices such as lidars or radars, etc.) configured to detect the surrounding environment. The imaging devices 222 can generate representations of the detected environment, such as digital images and/or point clouds, that may be processed via machine/computer vision (e.g., for automatic inspection, robot guidance, or other robotic applications). As described in further detail below, the robotic system 100 (via, e.g., the processors 202) can process the digital image and/or the point cloud to identify the target object 112 of FIG. 1, the start location 114 of FIG. 1, the task location 116 of FIG. 1, a pose of the target object 112, a confidence measure regarding the start location 114 and/or the pose, or a combination thereof.

For manipulating the target object 112, the robotic system 100 (via, e.g., the various circuits/devices described above) can capture and analyze an image of a designated area (e.g., a pickup location, such as inside the truck or on the conveyor belt) to identify the target object 112 and the start location 114 thereof. Similarly, the robotic system 100 can capture and analyze an image of another designated area (e.g., a drop location for placing objects on the conveyor, a location for placing objects inside the container, or a location on the pallet for stacking purposes) to identify the task location 116. For example, the imaging devices 222 can include one or more cameras configured to generate images of the pickup area and/or one or more cameras configured to generate images of the task area (e.g., drop area). Based on the captured images, as described below, the robotic system 100 can determine the start location 114, the task location 116, the associated poses, a packing/placement plan, a transfer/packing sequence, and/or other processing results. Details regarding the packing algorithm are described below.

In some embodiments, for example, the sensors 216 can include position sensors 224 (e.g., position encoders, potentiometers, etc.) configured to detect positions of structural members (e.g., the robotic arms and/or the end-effectors) and/or corresponding joints of the robotic system 100. The robotic system 100 can use the position sensors 224 to track locations and/or orientations of the structural members and/or the joints during execution of the task.

Discretization Model Processing

Figure 3B:
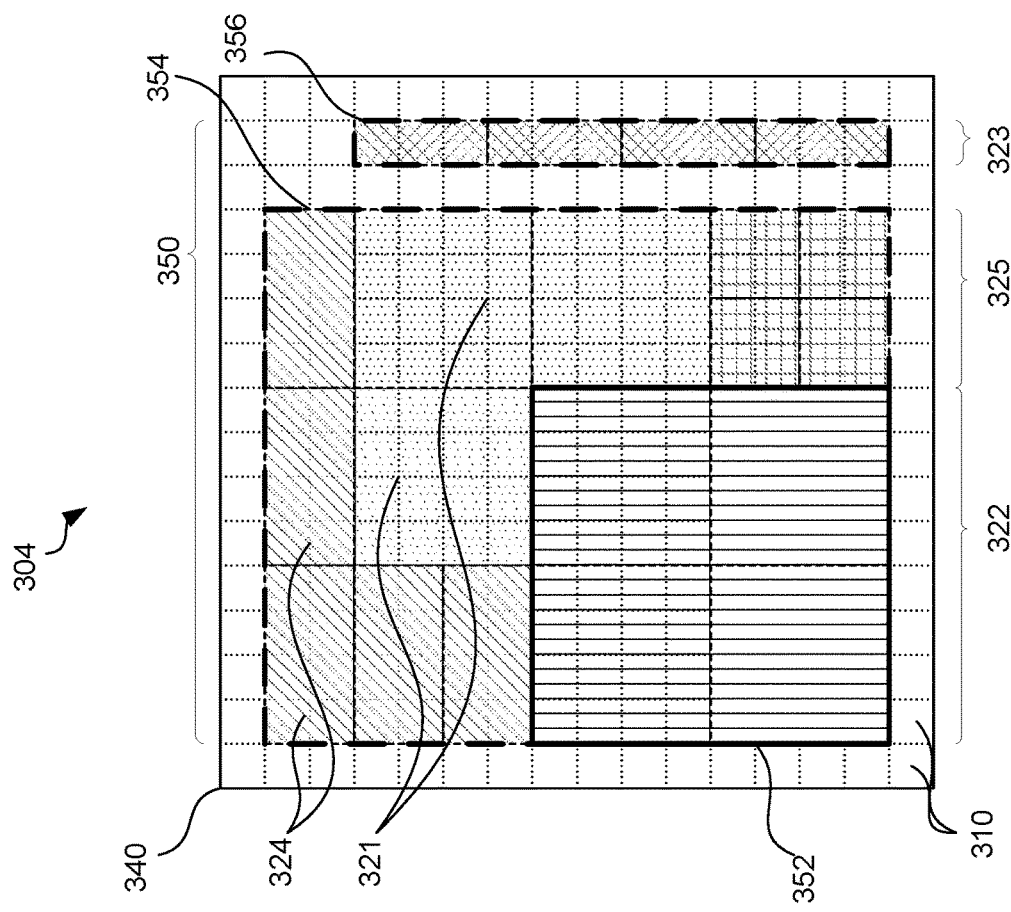
FIG. 3B is an illustration of discretized packing platform in accordance with one or more embodiments of the present technology.
Figure 3A:
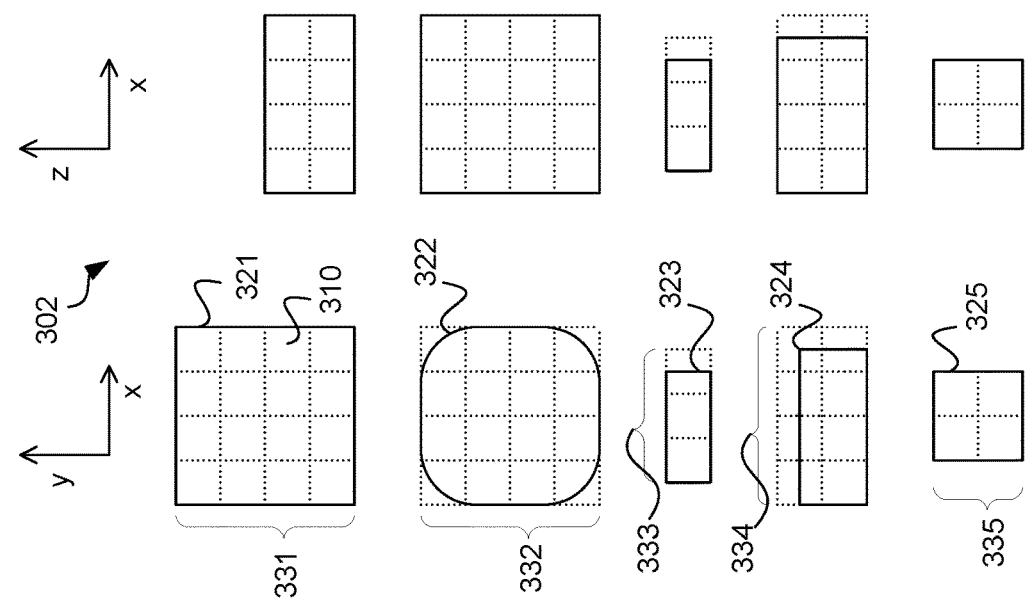
FIG. 3A is an illustration of discretized objects in accordance with one or more embodiments of the present technology.

FIG. 3A and FIG. 3B are illustrations of discretized data used to plan and pack objects in accordance with one or more embodiments of the present technology. FIG. 3A illustrates discretized objects and FIG. 3B illustrates discretized packing platform for the object packing and planning thereof. For example, the robotic system 100 of FIG. 1 (via, e.g., the processors 202 of FIG. 2) can map continuous surfaces/edges of real-world objects (e.g., packages, pallets, and/or other objects associated with the task) into discrete counterparts (e.g., unit lengths and/or unit areas). Also, the robotic system 100 can include discretized models/representations of the expected objects stored in the master data 252 of FIG. 2.

In some embodiments, as illustrated in FIG. 3A, the robotic system 100 can use discretized object models 302 to plan/derive stacking placements of objects. The discretized object models 302 (shown using dotted lines) can represent exterior physical dimensions, shapes, edges, surfaces, or a combination thereof (shown using solid lines) for known and/or expected objects (e.g., packages, boxes, cases, etc.) according to a discretization unit (e.g., a unit length). In some embodiments, as illustrated in FIG. 3B, the robotic system 100 can use one or more discretized platform models 304 to plan/derive stacking placements of objects. The discretized platform models 304 can represent a placement surface (e.g., a top surface of the pallet) according to the discretization unit. In some embodiments, the discretization unit can include a length that is preset by a system operator, a system designer, a predetermined input/setting, or a combination thereof.

In some embodiments, the discretized platform models 304 can include top views of one or more standard size pallets (e.g., 1.1 m by 1.1 m pallets). Accordingly, the discretized platform models 304 can correspond to pixelated 2D representations of the pallet top surfaces along a horizontal plane (e.g., the x-y plane) according to a grid system utilized by the robotic system 100. In some embodiments, the discretized object models 302 can include top views (e.g., x-y plane, as illustrated on the left side in FIG. 3A) and/or horizontal/profile views (e.g., x-z plane, as illustrated on the right side) for the objects expected/known by the robotic system 100. Accordingly, the discretized object models 302 can correspond to pixelated 2D/3D representations of the objects.

As an illustrative example, the robotic system 100 can use unit pixels 310 (e.g., polygons, such as squares, having one or more dimensions according to the discretization unit) to describe areas/surfaces of targeted objects (via, e.g., the discretized object models 302) and loading platforms (via, e.g., the discretized platform models 304). Accordingly, the robotic system 100 can pixelate the objects and the loading platforms along the x-y axes. In some embodiments, the size of the unit pixels 310 (e.g., the discretization unit) can change according to dimensions of the objects and/or dimensions of the loading platforms. The size of the unit pixels 310 can also be adjusted (via, e.g., a preset rule/equation and/or operator selection) to balance required resources (e.g., computation times, required memory, etc.) with packing accuracy. For example, when the size decreases, the computation times and the packing accuracy can increase. Accordingly, discretization of the packing tasks (e.g., the target packages and the packing platforms) using adjustable unit pixels 310 provides increased flexibility for palletizing the packages. The robotic system 100 can control a balance between the computation resources/time with the packing accuracy according to unique scenarios, patterns, and/or environments.

For the examples illustrated in FIG. 3A and FIG. 3B, the robotic system 100 can expect/process objects corresponding to a first package type 321, a second package type 322, a third package type 323, a fourth package type 324, and/or a fifth package type 325. The robotic system 100 can plan and place/stack the packages on a placement pallet 340 that corresponds to the task location 116 of FIG. 1. For the placement planning, the robotic system 100 can generate and/or utilize the discretized object models 302 including a first object model 331, a second object model 332, a third object model 333, a fourth object model 334, and/or a fifth object model 335 that respectively represent the corresponding packages using the unit pixels 310. Similarly, the robotic system 100 can generate and/or utilize the discretized platform model 304 for the placement pallet 340 using the unit pixels 310.

In some embodiments, the robotic system 100 can round up (e.g., for the discretized object models 302, such as for the third object model 333 and/or the fourth object model 334) the actual dimension of the object such that the unit pixels 310 extend beyond the actual peripheral edges of the object. In some embodiments, the robotic system 100 can round down (e.g., for the discretized platform models 304) the actual dimensions of the platform surface such that the unit pixels 310 are overlapped and/or contained within the actual peripheral edges of the object.

Based on the discretized data/representations, the robotic system 100 can generate a placement plan 350 for placing/packing the packages onto the placement pallet 340. The placement plan 350 can include planned locations on the placement pallet 340 for the targeted packages. The robotic system 100 can generate the placement plan 350 for placing one or more of available packages designated for loading/palletization. For example, the robotic system 100 can generate the placement plan 350 for stacking a set of packages from the available packages (e.g., received packages and/or outgoing ordered packages).

The robotic system 100 can generate the placement plan 350 according to a set of placement rules, placement conditions, parameters, requirements, etc. In some embodiments, the robotic system 100 can generate the placement plan 350 based on packages grouped according to the set, such as according to the package types (e.g., package types 321-325), package heights, customer specified priority, fragility (e.g., maximum supported weight, such as for packages stacked thereon), weight range, or a combination thereof. In some embodiments, the robotic system 100 can generate the placement plan 350 according to stacking conditions, such as, e.g., stacking the taller packages further away from the depalletizing unit. Other examples of the placement rules, conditions, parameters, requirements, etc. can include package dimensions, collision free requirement, stack stability, the grouping conditions (e.g., package types, package heights, priority, etc.), package separation requirements or the absence thereof, maximization of total loaded packages, or a combination thereof. Details regarding the placement planning is described below.

For the example illustrated in FIG. 3B, the robotic system 100 can generate the 2D placement plan (e.g., the placement plan 350) for a set of packages that correspond to the packages types 321-325. The robotic system 100 can generate the placement plan 350 that places three packages of the first package type 321, four packages of the second package type 322, four packages of the third package type 323, five packages of the fourth package type 324, and four packages of the fifth package type 325. The placement plan 350 can group the packages to maximize adjacent groupings of packages with similar height (e.g., equal or within a threshold limit from each other). Accordingly, the robotic system 100 can group the four of the second package type 322 in a 2×2 arrangement located at the lower left-hand corner of the placement pallet 340. A second grouping of packages (e.g., the packages of the first package type 321, the fourth package type 324, and the fifth package type 325) can be placed around the initially placed group. Accordingly, the continuous surface area for the first grouping (e.g., at a height of four unit pixels 310) and the surface area for the second grouping (e.g., at a height of two unit pixels 310) can be maximized. Also, the robotic system 100 can separate the packages of the third package type 323 based on one or more requirements, such as fragility (e.g., limiting the number of supported items) and/or separation requirements. Similarly, the robotic system 100 can generate the 2D placement plan according to boundary requirements (e.g., one or more of the unit pixels 310 from the edge of the placement pallet 340).

In some embodiments, the robotic system 100 can generate the placement plan 350 based on 2D planning (e.g., x-y footprint, such as a top-view) and/or 3D planning (e.g., x-z or y-z footprint, such as a profile-view). For example, the robotic system 100 can generate the placement plan 350 based on iteratively deriving potential 2D placements along the x-y plane, testing the potential placements according to the placement rules, conditions, etc., calculating a placement score, or a combination thereof. The robotic system 100 can generate the placement plan 350 based on selecting the 2D placement plan that optimizes (e.g., highest or lowest) the placement score. In some embodiments, the robotic system 100 can use the 2D placement plan to further generate a 3D plan (e.g., stacking plan; not shown in FIG. 3B). For example, the robotic system 100 can generate the 3D placement plan based on using the 2D placement plan as a layer within a stack. In other words, the robotic system 100 can place the generated 2D placement over/on top of one or more layers (e.g., other 2D placement plans) and/or under/below one or more other layers.

As an illustrative example, the robotic system 100 can estimate and consider heights of the placed objects in deriving the 2D plans. For example, the robotic system 100 can pixelate the object heights (e.g., stored in the master data) as shown in FIG. 3A. Also, the robotic system 100 can map the predetermined height data of the placed object to each of the unit pixels occupied by the object. With the heights mapped to each of the pixels, the robotic system 100 derive placement surfaces of the resulting 2D placement plan 350. The placement surfaces can each correspond to a derived surface/plane that can have, and support objects placed thereon, such as due same or similar heights of objects forming the derived surface The robotic system 100 can derive placement surfaces based on identifying groupings of unit pixels that have height values that are within a threshold range of each other. In some embodiments, the robotic system 100 can derive the placement surfaces based on identifying a maximum height for the placement plan 350. Based on the maximum height, the robotic system 100 can identify the unit pixels in the placement plan 350 having heights matching or within a threshold range from the maximum height. The robotic system 100 can derive an outline based on connecting corners and/or extending edges of outermost/perimeter unit pixels with qualifying heights to derive the placement surface. The robotic system 100 can recursively repeat the process for regions outside of the placement areas using lower heights. For the example illustrated in FIG. 3B, the robotic system 100 can derive a first placement surface 352, a second placement surface 354, and a third placement surface 356. The first placement surface 352 can correspond to the rectangular area shown in the lower left corner of the placement plan 350 with the maximum height of four unit pixels. The second placement surface 354 can correspond to the surrounding area (shown using dashed lines) with height of two unit pixels. The third placement surface 356 can correspond to the separate area on the right side of the placement plan 350 with the height of one unit pixel. Details for the 2D and 3D placement planning are described below.

Figure 3C:
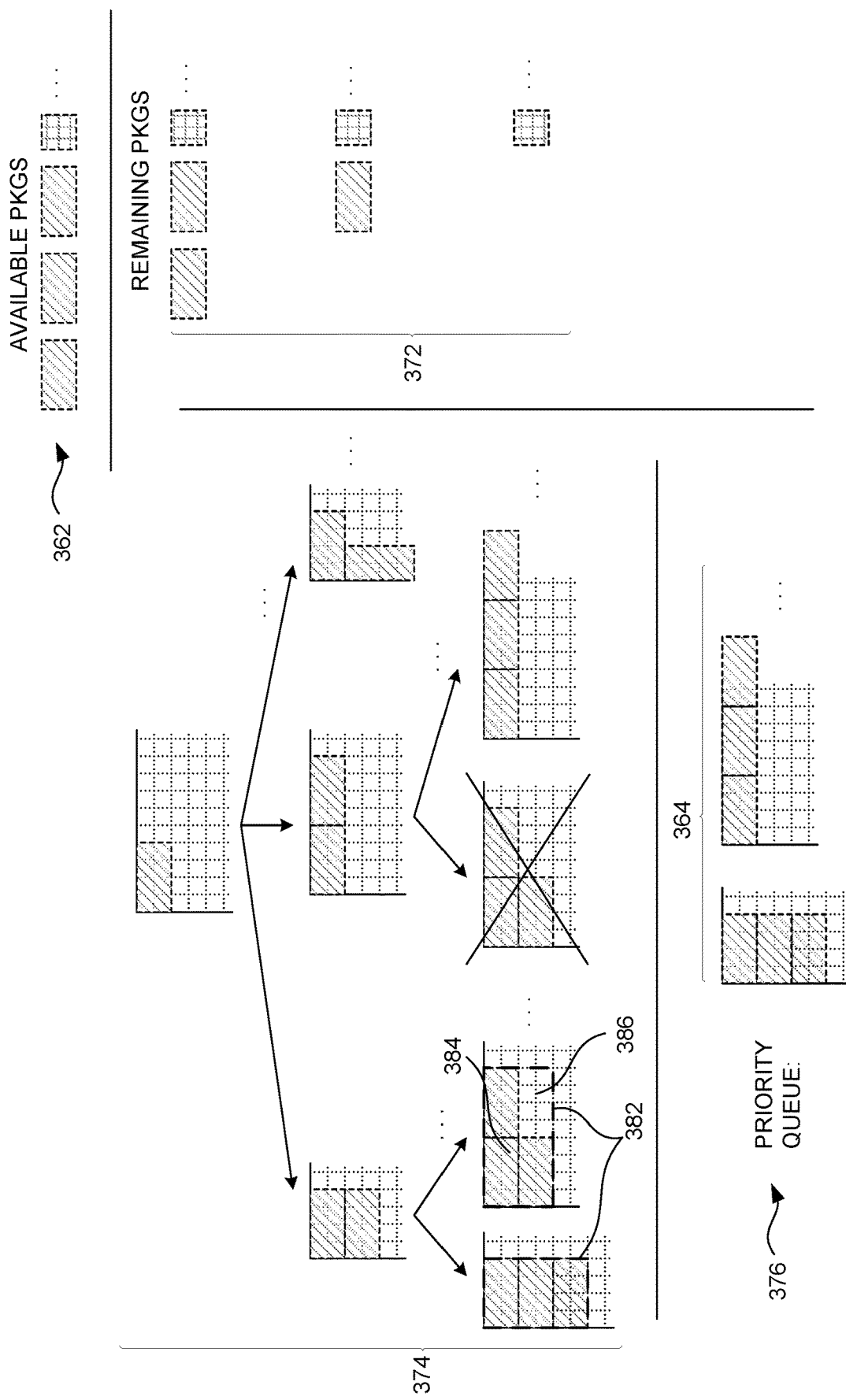
FIG. 3C is an illustration of a placement planning process in accordance with one or more embodiments of the present technology.

FIG. 3C is an illustration of a placement planning process in accordance with one or more embodiments of the present technology. The robotic system 100 (via, e.g., the one or more processors 202 of FIG. 2) can derive the placement plan 350 of FIG. 3B for a set of available packages 362. The available packages 362 can correspond to the objects that need to be packed for an egress shipment and/or storage. For example, the available packages 362 can correspond to incoming objects received via an ingress shipment and/or stored objects that have been ordered for an egress shipment. In some embodiments, the robotic system 100 can use a shipping manifest, an order list, etc. to identify the available packages 362 in real-time, such as directly in response to (i.e., within a threshold duration from) receiving the manifest, the list, etc. Accordingly, the robotic system 100 can use the identified available packages 362 to derive the placement plan 350 in real-time. As such, the robotic system 100 can use real-time conditions, availability, and/or demands to derive the placement plan 350 instead of off-line packing simulators that utilize a hypothetical number/set/combination of packages to derive plans that are applied regardless of real-time conditions. In some embodiments, the robotic system 100 can use devices (e.g., one or more of the processors 202) located at the location receiving, storing, and/or sending the objects, such as a shipping hub and/or a warehouse.

In some embodiments, as discussed in detail below, the robotic system 100 can group and/or sequence the available packages 362. The robotic system 100 can use the ordered set of the available packages 362 to derive the placement plan 350. The robotic system 100 can determine and evaluate unique placement locations/combinations for the available packages 362 to derive the placement plan 350. In other words, the robotic system 100 can determine a set of potential placement combinations 364 and evaluate (e.g., score) them according to a set of predetermined requirements, conditions, weights, costs, subsequent implications, or a combination thereof. Based on the evaluation, the robotic system 100 can select a placement combination to derive the placement plan 350.

In at least one embodiment, the robotic system 100 can derive the placement plan 350 using an algorithm that iteratively evaluates placements of the sequenced packages. As illustrated in FIG. 3C, for example, the robotic system 100 can begin the derivation by determining an initial placement for the first package in the available packages 362. Accordingly, the robotic system 100 can overlap the corresponding discretized object model 302 of FIG. 3A over the discretized platform model 304 of FIG. 3B at an initial location (e.g., a corner, a middle location, and/or another preset location). The robotic system 100 can track remaining packages 372 based on removing the placed package (e.g., the first package) from the available packages 362.

Based on the initial placement, the robotic system 100 can determine a set of possible placements for the second package in the available packages 362. The robotic system 100 can determine the set of possible placements according to a predetermined rule, pattern, or a combination thereof. For example, the robotic system 100 can determine the placement locations according to a pattern of locations relative to the previously placed package(s) (e.g., relative to the previously placed package(s)). Also, the robotic system 100 can determine the placement locations based on a minimum/maximum separation distance or a lack thereof required between one or more of the packages. Further, the robotic system 100 can determine the placement locations based on rotating the package (i.e., the corresponding discretized object model 302) according to a predetermined amount, such as 90 degrees. In some embodiments, the robotic system 100 can limit the placement possibilities according to a predetermined threshold and/or pattern. Further, the robotic system 100 can update the remaining packages 372 accordingly.

The robotic system 100 can repeat the above-described process and iteratively process the available packages 362 until a stopping condition is reached. Some examples of the stopping condition can represent that all packages have been placed (i.e., the remaining packages 372 is empty), the placements cannot be improved (e.g., same evaluation score as the previous tier/iteration), no more packages can be placed over the discretized platform model 304, or a combination thereof.

In some embodiments, the robotic system 100 can track the possible placements and the corresponding potential placement combinations 364 using a search tree 374. A root of the search tree 374 can correspond to the initial placement and each level or tier can include potential placements of the subsequent package in the available packages 362. The different tiers can be connected to form a branch that corresponds to a unique combination of placements for the set of packages.

For potential placements of each package, the robotic system 100 can identify and eliminate (e.g., represented by 'X' in FIG. 3C) redundant footprints. For example, at each tier of the search tree 374, the robotic system 100 can compare (e.g., overlay) the resulting footprints of the potential placement locations/combinations. Based on the comparison, the robotic system 100 can eliminate duplicates of the resulting footprints. In some embodiments, the robotic system 100 can further compare transposed, rotated, and/or mirrored versions of the resulting footprints to eliminate related duplicates. For example, the robotic system 100 can rotate one footprint by 90 degrees and/or transpose the footprint across one or more mirroring lines (e.g. a diagonal line extending across opposing corners, a bisecting line(s) extending along x and/or y directions, or a combination thereof) and compare it to other footprints.

Also, for potential placements of each package, the robotic system 100 can identify and eliminate placements that violate one or more requirements/constraints. One example of the requirements/constraints can be based on collision probabilities. The robotic system 100 can calculate an approach path for each placement location and a corresponding collision probability according to the pre-existing footprint, one or more dimensions of the packages, a location of the transfer robot, a previous event or history, or a combination thereof. The robotic system 100 can eliminate the placements where the collision probability exceeds a predetermined threshold. Another example of the requirements/constraints can be a supported weight for stacking (i.e., placing directly on/over one or more support packages) the package. For one or more of the packages under the placement location, the robotic system 100 can calculate a support weight (i.e., a combined weight of packages or portions thereof directly over) based on the weight of the placed package. The robotic system 100 can eliminate the placements where the support weight violates (e.g., exceeds or is within a threshold range from) a fragility requirement (e.g., a maximum supportable weight) for one or more of the packages under the placement location.

In some embodiments, the robotic system 100 can track and/or evaluate the placement combinations 364 using a priority queue 376 (e.g., a heap structure etc.). The priority queue 376 can order the placement combinations 364 according to a sequence of preferences. The robotic system 100 can evaluate or score each of the placement combinations 364 according to one or more predetermined criteria. The criteria can include one or more costs associated with already placed items and/or one or more heuristic scores associated with how the current placement affects future placements or possibilities.

One example of the criteria can include maximization of footprint density. The robotic system 100 can calculate the footprint density for an outer perimeter 382 for a grouping of packages. In some embodiments, the outer perimeter 382 can be determined based on exposed/outer perimeter edges of the grouping of packages. The robotic system 100 can further enclose surrounding/related areas by extending two or more edges and finding an intersect and/or by drawing a line that connects one or more corners of the footprint. The robotic system 100 can calculate the footprint density as a ratio between an actual occupied area 384 (e.g., a number of unit pixels 310 corresponding to the shaded area) and an empty area 386 (e.g., a number of unit pixels 310 corresponding to the enclosed/related areas). The robotic system 100 can be configured to prefer (e.g., by assigning a higher/lower score) to placement plans that minimize the empty area 386.

Stacking Rules

FIGS. 4A-4C are illustrations of stacking rules in accordance with one or more embodiments of the present technology. The robotic system 100 can use the stacking rules to place packages on top of each other, such as for stacking/placing one or more layers of packages above one or more other layer(s) of packages. The robotic system 100 can use the stacking rules for improving stability of the stacked packages and prevent any packages from slipping and/or tipping during movement of the pallet. For illustrative purposes, FIGS. 4A-4C show a top package 452 directly above and supported by (e.g., directly contacting) one or more support packages 454.

FIG. 4A illustrates a horizontal offset rule 402 used to generate 3D placements (e.g., the 3D placement plan 350). The horizontal offset rule 402 can include a regulation, a requirement, or a combination thereof for controlling horizontal offsets of vertical edges/surfaces between stacked items. For example, the horizontal offset rule 402 can be based on an overlap requirement 422, an overhang requirement 424, or a combination thereof. The overlap requirement 422 can include a minimum amount (e.g., a percentage or a ratio of length, width, and/or surface area) of overlap between the stacked packages. In some embodiments, the overlap requirement 422 can require that a minimum amount of horizontal dimension/surface area of the top package 452 is overlapped with that of the support package 454. The overhang requirement 424 can include a maximum amount (e.g., a percentage or a ratio of length, width, and/or surface area) of overhang, such as a portion of the top package 452 that horizontally extends past a perimeter edge/surface of the support package 454.

In some embodiments, the horizontal offset rule 402 can be based on weight, dimension, and/or center-of-mass (CoM) locations 412. For example, the overlap requirement 422 and/or the overhang requirement 424 can be based on the CoM locations 412, such as for evaluating a distance between the CoM locations 412 of the top package 452 and the support package 454 relative to a distance between the top CoM location and a horizontal edge/surface of the support package 454 and/or an overhang distance (e.g., a measure along a horizontal direction of a portion of the top package 452 extending past peripheral edge(s) of the support package 454). In some embodiments, the horizontal offset rule 402 can be based on a CoM offset requirement 426 that requires the CoM locations 412 of the top packages 452 and the support packages 454 to be within a threshold. The threshold can include a predetermined distance, a threshold limit for a ratio between the offset distance between the CoM locations 412 relative to a horizontal dimension, an overhang distance, an overlapped distance, or a combination thereof.

FIG. 4B illustrates a support separation rule 404 used to generate 3D placements (e.g., a stacking plan). The support separation rule 404 can include a regulation, a requirement, or a combination thereof for controlling a horizontal separation distance 414 between the support packages 454. The horizontal separation distance 414 can correspond to a horizontal distance between peripheral surfaces/edges of adjacent support packages 454. In some embodiments, the support separation rule 404 can be further based on locations and/or amounts of overlapped surfaces between the top package 452 and the support packages 454. For example, the support separation rule 404 can require that the horizontal separation distance 414 to be larger than any overhang distances by a predetermined percentage. Also, the support separation rule 404 can require that the horizontal separation distance 414 extends under the CoM location 412 of the top package 452.

FIG. 4C illustrates a vertical offset rule 406 used to generate 3D placements (e.g., the 3D placement plan 350). The vertical offset rule 406 can include a regulation, a requirement, or a combination thereof for controlling a support height difference 416 between vertical locations of the supporting packages 454. The support height difference 416 can correspond to a vertical distance between top portions of corresponding support packages 454, such as for portions that would likely contact the top package 452 placed over the corresponding support packages 454. In some embodiments, the vertical offset rule 406 can require the support height difference 416 to be under a predetermined threshold requirement for stacking one or more packages on top of the supporting packages 454. In some embodiments, the support separation rule 404 can vary based on the layer height. For example, when the top package 452 (e.g., the supported package) is part of the top-most layer, the limit for the support height difference 416 can be greater than for the lower layers.

The robotic system 100 can generate stacking plans (e.g., a 3D combination of multiple 2D placement plans) according to the stacking rules. For example, the robotic system 100 can generate the 2D placement plans (e.g., the placement plan 350 of FIG. 3B) according to height requirements (e.g., for keeping the heights of the package groupings within a threshold distance). Subsequently, the robotic system 100 can generate the stacking plans based on vertically overlapping (e.g., stacking) the 2D placement plans.

Stacking Sequence

FIG. 5A is an illustration of an example of a stacking plan 502 (e.g., a plan representing a 3D mapping of the available packages and/or the placement plans 350 correspond to layers within the 3D mapping) in accordance with one or more embodiments of the present technology. For illustrative purposes, the stacking plan 502 is illustrated using a first layer 512, a second layer 514, and a third layer 516 for a first stack 520 of the packages (e.g., e.g., at least the packages 1-1 to 1-4, 2-1 to 2-2, and 3-1 to 3-3). Each of the first layer 512, the second layer 514, and the third layer 516 can be an instance of the placement plan 350. The first layer 512 can be on the bottom such that the packages (e.g., at least the packages 1-1, 1-2, 1-3, and 1-4) therein directly contact the placement pallet 340. The packages (e.g., at least the packages 2-1 and 2-2) in the second layer 514 can be directly on (i.e. having direct contact with) and above the first layer 512. Similarly, the packages (e.g., at least the packages 3-1 and 3-2) of the third layer 516 can be directly on and contact the second layer 514.

As discussed in detail below, the robotic system 100 can plan each of the layers separately while considering vertical parameters (e.g., supported weight, layer height, etc.). In generating the stacking plan 502, the robotic system 100 can vertically combine and/or sequence the separate layers according to the vertical parameters and/or the stacking rules. In some embodiments, the robotic system 100 can plan the layers according to vertical placement of the packages. For example, the robotic system 100 can generate the first layer 512 as including all packages that directly contact the placement pallet 340, such as including the bottom two packages in a second stack 522. Also, the robotic system 100 can plan the package labeled '3-3' as part of the second layer 514. In some embodiments, the robotic system 100 can re-plan and/or adjust the layers (e.g., the placement plan 350) in generating the stacking plan 502. For example, the robotic system 100 can adjust the layers to facilitate the stacking/placement sequence. As illustrated in FIG. 5A, the robotic system 100 can adjust the layers such that the second stack 522 is considered a separate stack (i.e., separate from the first, second, and third layers 512-516). Accordingly, the robotic system 100 can be free to plan and/or stack the packages of the second stack 522 separately/differently from the layers of the first stack 520.

Also, in some embodiments, the robotic system 100 can move larger packages closest to the transfer unit 104 of FIG. 1 (e.g., the palletizing robot) to a higher layer to facilitate stacking sequence. Assuming that the transfer unit 104 is to the right of the placement pallet 340 illustrated in FIG. 5A, the '3-3' package can become an obstacle (i.e., due to its height) if it is placed before packages labeled '3-1' and '3-2'. Accordingly, the robotic system 100 can adjust the layers such that the '3-3' package is part of a higher layer (e.g., the third layer 516 instead of the second layer 512). As a result, when the robotic system 100 places the packages according to the layers, the '3-3' package can be placed after the '3-1' and '3-2' packages.

In other alternative embodiments, the robotic system 100 can separately calculate the stacking or placement sequences based on analyzing the stacking plan 502 without being bound to the layers. For discussion purposes, FIG. 5B is an illustration of a stacking sequence 530 (e.g., an identification of a placing order for the available packages) that is not bound by stacking of packages according to the layers in accordance with one or more embodiments of the present technology. The stacking sequence 530 can be for placing a stacked package 532 above a supporting package and horizontally between two end packages. The stacking sequence 530 can be such that the package (labeled '1') furthest from the transfer unit 104 (not illustrated in FIG. 5B, assumed to be located to the right of the placement pallet 340) can be placed first and the second package (labeled '2') is placed on the placement pallet 340 afterwards. The robotic system 100 can calculate the stacking sequence 530 such that the stacked package 532 (labeled '3') is placed before (e.g., third) one of the end packages 534 (labeled '4'). As described above, the robotic system 100 can calculate the stacking sequence 530 based on adjusting the one of the end packages 534 to belong to a second layer with the stacked package 532 or based on independently calculating the stacking order from the stacking plan 502.

Operational Flow

Figure 6:
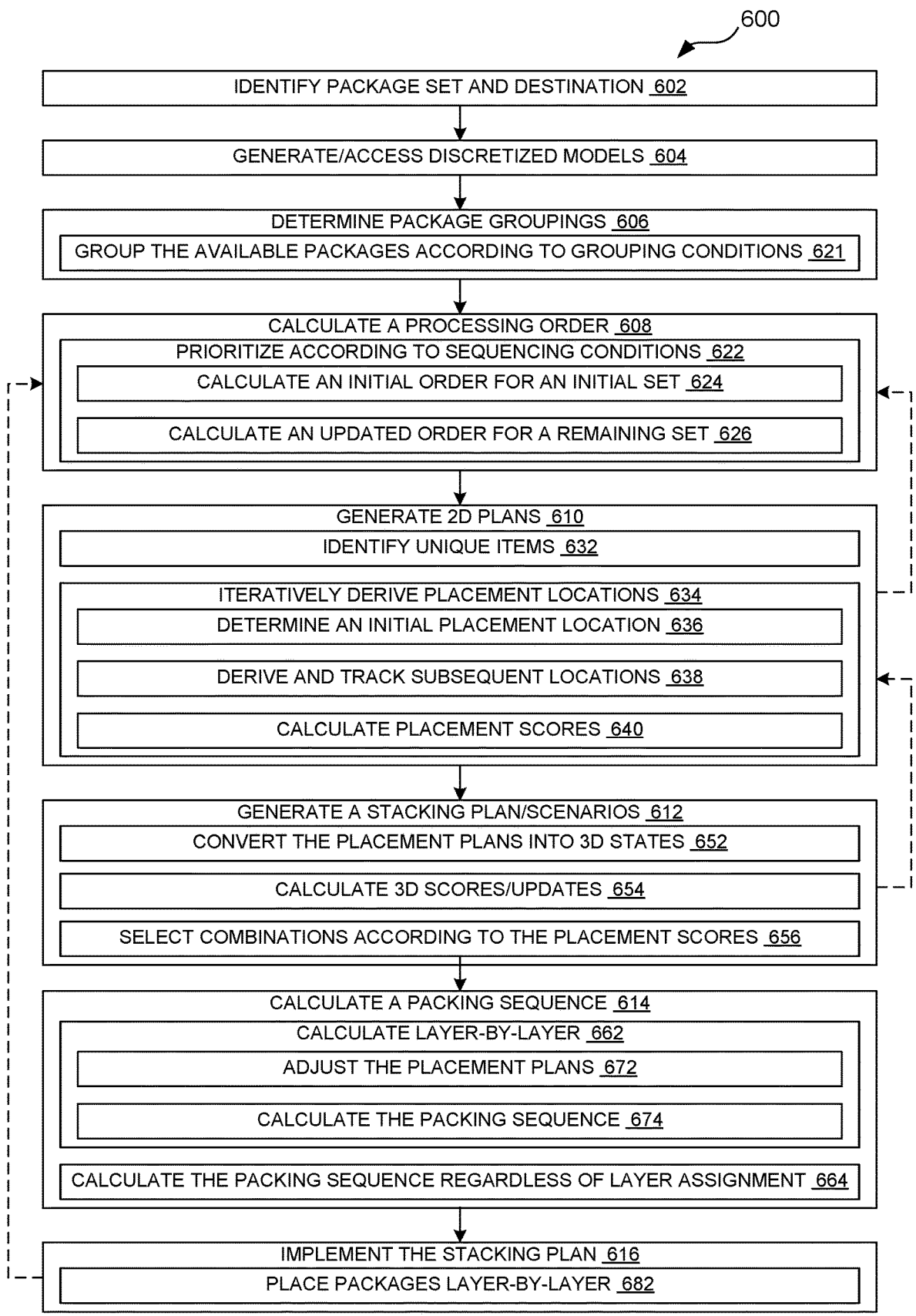
FIG. 6 is a flow diagram for operating the robotic system of FIG. 1 in accordance with one or more embodiments of the present technology.

FIG. 6 is a flow diagram for a method 600 of operating the robotic system 100 of FIG. 1 in accordance with one or more embodiments of the present technology. The method 600 can be for generating 2D/3D packing plans for placing packages (e.g., cases and/or boxes) on to a platform (e.g., a pallet) and/or for placing the packages accordingly. The method 600 can be implemented based on executing the instructions stored on one or more of the storage devices 204 of FIG. 2 with one or more of the processors 202 of FIG. 2.

At block 602, the robotic system 100 can identify a package set (e.g., the available packages 362 of FIG. 3C) and a destination (e.g., the task location 116 of FIG. 1, such as a pallet and/or a container for receiving the packages). For example, the robotic system 100 can identify the package set to represent the available packages 362 including packages that are available for packing, located at a source, designated for placement, and/or listed in an order/request/manifest. Also, the robotic system 100 identify a size or a dimension of an area (e.g., a top loading surface of the pallet, such as the placement pallet 340 of FIG. 3) of the task location 116 where the packages can be placed. In some embodiments, the robotic system 100 can identify a size, a dimension, a type, or a combination thereof for a pallet.

At block 604, the robotic system 100 can generate and/or access discretized models (e.g., the discretized object models 302 of FIG. 3A and/or the discretized platform models 304 of FIG. 3B) corresponding to the package set that represent the available packages 362 and/or the task location 116. In some embodiments, the robotic system 100 can generate (e.g., in real-time, such as after receiving the order and/or prior to beginning the packing operation, or offline) the discretized models based on dividing physical dimensions of the objects and/or the platform area (e.g., the pallet top surface according to the unit pixel 310 of FIG. 3B). The unit pixel 310 can be predetermined (by, e.g., a manufacturer, an ordering customer, and/or an operator), such as at 1 millimeters (mm) or ⅟₁₆ inches (in) or greater (e.g., at 5 mm or 20 mm). In some embodiments, the unit pixel 310 can be based (e.g., a percentage or a fraction) on a dimension or a size of one or more of the packages and/or the platform.

In some embodiments, the robotic system 100 can access the discretized models stored in the storage devices 204 and/or another device (e.g., a storage device, a database, and/or a server of a package supplier accessed via the communication devices 206 of FIG. 2). The robotic system 100 can access the predetermined discretized models that represents the available packages 362 and/or the task location 116. For example, the robotic system 100 can access the discretized object models 302 corresponding to the available packages 362 by searching the master data 252 of FIG. 2 (e.g., a predetermined table or a lookup table) for the available packages and their corresponding models. Similarly, the robotic system 100 can access the discretized platform model 304 representing the platform, such as the identified pallet, where the available packages are to be placed.

At block 606, the robotic system 100 can determine package groupings (e.g., subgroupings of the available packages). The robotic system 100 can determine the package groupings based on the available packages 362 for placing them on the identified platform (e.g., the placement pallet 340). The robotic system 100 can determine the package groupings according to similarities and/or patterns in one or more characteristics of the available packages 362. In some embodiments, as illustrated at block 621, the robotic system 100 can determine the package grouping by grouping the available packages 362 according to grouping conditions/requirements. Some examples of the grouping conditions/requirements can include a package priority (e.g., as specified by one or more customers), a fragility rating (e.g., a maximum weight supportable by the package), a weight, a package dimension (e.g., a package height), a package type, or a combination thereof. In grouping the available packages 362, the robotic system 100 can search the master data 252 for the various characteristics of the available packages 362 that match the grouping conditions/requirements.

At block 608, the robotic system 100 can calculate a processing order (e.g., a sequence for considering/deriving placement locations) for the available packages 362 and/or the groupings thereof (i.e., the package groupings). In some embodiments, as illustrated at block 622, the robotic system 100 can calculate the processing order according to one or more sequencing conditions/requirements. For example, the robotic system 100 can prioritize placement planning of the package groupings according to a number of packages within each of the groupings, such as for processing the package groupings with greater number of packages earlier in the placement planning. In some embodiments, the sequencing conditions can overlap with the grouping conditions, such as for the weight ranges, the fragility ratings, etc. For example, the robotic system 100 can prioritize the processing of the heavier and/or the less fragile packages for earlier processing and/or for placement in lower layers.

In some embodiments, the robotic system 100 can prioritize the placement planning according to a combined horizontal area. The robotic system 100 can calculate (via, e.g., multiplying corresponding widths and lengths) or access surface areas of top surfaces of the packages in the groupings using information specified in the master data 252. In calculating the combined horizontal area, the robotic system 100 can add the surface areas of packages having the same type and/or heights within a threshold range. In some embodiments, the robotic system 100 can prioritize the placement planning of groupings that have the larger combined horizontal area for earlier processing and/or for placement in lower layers.

For one or more embodiments, the robotic system 100 can load a buffer with identifiers and/or quantities of the available packages 362. The robotic system 100 can sequence the identifiers in the buffer according to the groupings. Further, the robotic system 100 can sequence the identifiers in the buffer according to the processing order. Accordingly, the sequenced values in the buffer can correspond to the available packages 362 and/or the remaining packages 372 illustrated in FIG. 3C.

As illustrated at block 624, for example, the robotic system 100 can calculate the processing order for an initial set (e.g., the package set) of the available packages 362 before implementing the corresponding stacking plan 502 of FIG. 5, such as before any of the packages in the package set is placed on the platform. In some embodiments, as illustrated at block 626, the robotic system 100 can calculate the processing order for a remaining set of the available packages 362 after initiating or while implementing the corresponding stacking plan 502. For example, as illustrated by a feedback loop from block 616, the robotic system 100 can calculate the processing order for the remaining set (e.g., a portion of the available packages 362 that have not been transferred to the platform and/or remain at a source location) according to one or more triggering conditions. Example triggering conditions can include stacking errors (e.g., lost or fallen packages), collision events, predetermined retriggering timings, or a combination thereof.

At block 610, the robotic system 100 can generate 2D plans (e.g., the placement plans 350 of FIG. 3B) for placing the available packages 362 along a horizontal plane. For example, the robotic system 100 can generate the placement plans 350 to represent the 2D mappings of the available packages 362 along the horizontal plane. The robotic system 100 can generate two or more placement plans based on the discretized models. For example, the robotic system 100 can generate the placement plans 350 based on comparing the discretized object models 302 to the discretized platform model 304. The robotic system 100 can determine different placements/arrangements of the discretized object models 302, overlap/compare them to the discretized platform model 304, and validate/retain the arrangements that are within the boundaries of the discretized platform model 304 when overlapped. The robotic system 100 can designate the packages that cannot be placed within the boundaries of the discretized platform model 304 for another layer (e.g., another instance of the placement plans 350). Accordingly, the robotic system 100 can iteratively derive placement locations for the placement plans 350 that represent 2D layers of the stacking plan 502 until each of the packages in the package set have been assigned a location in the placement plans 350.

In some embodiments, the robotic system 100 can generate the placement plans 350 based on the package groupings. For example, the robotic system 100 can determine the arrangements for the packages within one package grouping before considering placements of packages in another grouping. When packages within a package grouping over flows a layer (i.e., cannot fit in one layer or one instance of the discretized platform model 304) and/or after placing all packages of one grouping, the robotic system 100 can assign locations for the packages in the next grouping to any remaining/unoccupied areas in the discretized platform model 304. The robotic system 100 can iteratively repeat the assignments until none of the unassigned packages can fit over remaining spaces of the discretized platform model 304.

Similarly, the robotic system 100 can generate the placement plans 350 based on the processing order (e.g., based on the package groupings according to the processing order). For example, the robotic system 100 can determine a test arrangement based on assigning packages and/or groupings according to the processing order. The robotic system 100 can assign the earliest sequenced package/grouping an initial placement for the test arrangement, and then test/assign the subsequent packages/groupings according to the processing order. In some embodiments, the robotic system 100 can retain the processing order for the packages/groupings across layers (e.g., across instances of the placement plans 350). In some embodiments, the robotic system 100 can recalculate and update (illustrated using dashed feedback line in FIG. 6) the processing order after each layer is filled.

In some embodiments, as an illustrative example of the above described processes, the robotic system 100 can generate the 2D plans by identifying the different package types (e.g., the first, second, third, fourth, and/or the fifth package type 321-325 of FIG. 3A, respectively) within the package set. In other words, at block 632, the robotic system 100 can identify unique packages (e.g., as represented by the package types) within each of the package grouping and/or the package set.

At block 634, the robotic system 100 can derive (e.g., iteratively) placement locations for each of the available packages 362. At block 636, the robotic system 100 can determine an initial placement location for the unique package first in sequence according to the processing order. The robotic system 100 can determine the initial placement location according to a predetermined pattern as described above. In some embodiments, the robotic system 100 can calculate initial placements for each unique package. The resulting initial placements can each be developed into a unique placement combination (e.g., an instance of the search tree 374 of FIG. 3C), such as by tracking the placement plan 350 across iterations. At block 638, the robotic system 100 can derive and track candidate placement locations for the subsequent packages according to the processing order and/or the remaining packages 372 as described above. Accordingly, the robotic system 100 can iteratively derive the placement combinations 364 of FIG. 3C.

In deriving the placement combinations 364 (e.g., candidate placement locations), the robotic system 100 can test/evaluate locations of the discretized object model 302 of the corresponding package based on iteratively deriving and evaluating candidate stacking scenarios (e.g., potential combinations of unique placement locations for the available packages). The candidate stacking scenarios can each be derived based on identifying unique potential locations (e.g., according to a predetermined sequence/rule for placement locations) for the packages according to the above discussed sequence. The candidate stacking scenarios and/or the unique placement locations can be evaluated according to one or more placement criteria (e.g., requirements, constraints, placement costs, and/or heuristic scores). For example, the placement criteria can require that the discretized object models 302 entirely fit within horizontal boundaries of the discretized platform model 304 when placed at the selected location. Also, the placement criteria can require that placement of the discretized object models 302 be within or over a threshold distance relative to the initial placement location (e.g. such as along a horizontal direction) and/or the previous placement location, such as for adjacent placements or separation requirements. Other examples of the placement criteria can include preferences for adjacently placing packages having smallest difference(s) in one or more package dimensions (e.g., height), the fragility ratings, the package weight ranges, or a combination thereof. In some embodiments, the placement criteria can include collision probabilities that can correspond to locations and/or characteristics (e.g., height) of previously assigned packaged in the layer relative to a reference location (e.g., location of the palletizing robot). Accordingly, the robotic system 100 can generate multiple unique placement combinations (i.e., candidate placement plans for each layer and/or the candidate stacking scenarios that each layer includes multiple layers) of package placement locations. In some embodiments, the robotic system 100 can track the placements of the combination based on generating and updating the search tree 374 across the placement iterations.

At block 640, the robotic system 100 can calculate/update a placement score for each combination/package placement. The robotic system 100 can calculate the placement score according to one or more of the placement conditions/preferences (e.g., package dimensions, collision probabilities, fragility ratings, package weight ranges, separation requirements, package quantity conditions). For example, the robotic system 100 can use preference factors (e.g., multiplier weights) and/or equations to describe a preference for: separation distances between packages, differences in package dimensions/fragility ratings/package weights for adjacent packages, the collision probabilities, continuous/adjacent surfaces at the same height, a statistical result thereof (e.g., average, maximum, minimum, standard deviation, etc.), or a combination thereof. Each combination can be scored according to the preference factors and/or the equations that may be predefined by a system manufacturer, an order, and/or a system operator. In some embodiments, the robotic system 100 can calculate the placement score at the end of the overall placement iterations.

In some embodiments, the robotic system 100 can update the sequence of the placement combinations 364 in the priority queue 376 of FIG. 3C after each placement iteration. The robotic system 100 can update the sequence based on the placement score.

The robotic system 100 can stop the placement iterations, such as when one candidate placement plan is finished, based on determining an empty source status, a full layer status, or an unchanged score status. The empty source status can represent that all of the available packages have been placed. The full layer status can represent that no other package can be placed in the remaining areas of the considered discretized platform model 304. The unchanged score status can represent that the placement score for the combination remains constant across one or more consecutive placement iterations. In some embodiments, the robotic system 100 can repeat the placement iterations using different initial placement locations and/or different processing order (e.g., for reordering groups having same sequencing value/score associated with the sequencing conditions) to derive other instances of the candidate stacking scenarios. In other words, the robotic system 100 can generate multiple 2D placement plans, where each 2D placement plan can represent a layer within a 3D stack (e.g., an instance of the candidate stacking scenarios). In other embodiments, the robotic system 100 can iteratively consider the 3D effect as a 2D placement plan is derived and begin deriving the next layer as a next iteration when the 2D placement plan becomes full.

At block 612, the robotic system 100 can generate a stacking plan (e.g., the stacking plan 502). In some embodiments, the robotic system 100 can begin generating the stacking plan 502 when the placement location of the processed package overlaps one or more previously placed/processed packages.

In generating the stacking plan 502 and/or assessing the 2D plans, the robotic system 100 can convert each of the placement combinations 364 and/or the placement plans into 3D states as illustrated at block 652. For example, the robotic system 100 can assign the height values for the packages to the placement combinations 364. In other words, the robotic system 100 can generate a contour map (an estimate of a depth map) based on the adding the package heights to placement combinations 364.

With the 3D states, the robotic system 100 can evaluate the placement combinations 364 according to one or more stacking rules (e.g., the horizontal offset rule 402 of FIG. 4A, the support separation rule 404 of FIG. 4B, and/or the vertical offset rule 406 of FIG. 4C). As an illustrative example, when the placed package is stacked on/over one or more previously processed packages, the robotic system 100 can eliminate any of the placement combinations 364 that violate the overlap requirement 422 of FIG. 2, the overhang requirement 424 of FIG. 4A, the vertical offset rule 406, the CoM offset requirement 426 of FIG. 4A, or a combination thereof described above. In one or more embodiments, the robotic system 100 can eliminate any of the placement combinations 364 that violate fragility ratings of one or more packages under the processed package, such as by estimating the supported weights at the overlapped packages and comparing them to the corresponding fragility ratings.

For the remaining placement combinations 364, the robotic system 100 can calculate 3D placement scores or update the placement score, such as illustrated at block 654. The robotic system 100 can use predetermined preferences (e.g., weights and/or equations) associated with placement costs and/or heuristic values for 3D placements. The predetermined 3D preferences can be similar to the 2D preferences, grouping preferences, sequencing conditions, or a combination thereof. For example, the 3D preferences can be configured to calculate collision probabilities based on the 3D state and to calculate scores that favor the placement combinations with lower collision probabilities. Also, the robotic system 100 can calculate the scores based on the remaining packages 372, sizes of support areas with common height, number of packed items in the 3D state, difference between the heights of the processed packages, or a combination thereof. In some embodiments, the robotic system 100 can update the sequence of the placement combinations 364 in the priority queue 376 according to the scores.

After the 3D states have been processed, the robotic system 100 can update the 2D plans by deriving a placement for the next package in the remaining packages 372, such as at block 610. The robotic system 100 can repeat the above-described process until a stopping condition, such as when all of the available packages 362 have been processed (i.e., empty value/set for the remaining packages 372) and/or when the placement combinations 364 cannot be improved (also referred to as unimproved combinations). Some examples of unimproved combinations can include when the currently processed placement eliminates the last of the placement combinations 364 in the priority queue 376 due to one or more of the violations and/or when the placement score remains constant for the preferred combinations across a threshold number of iterations.

When the stopping condition is detected, such as at block 656, the robotic system 100 can select one of the derived placement combinations 364 according to the placement scores (e.g., the 2D and/or the 3D related scores). Accordingly, the robotic system 100 can designate the selected placement combination as the stacking plan 502 (e.g., a set of the placement plans 350).

In some embodiments, as an illustrative example, the robotic system 100 can implement the functions of block 610 and 612 differently. For example, at block 610, the robotic system 100 can generate the 2D plan (e.g., an instance of the placement plan 350) for a bottom layer as described above. In doing so, the robotic system 100 can be configured to place heavier preference (e.g., greater parameter weights) for matching package heights, heavier package weights and/or greater supportable weight for the packages in considering the placements and/or the processing order. The robotic system 100 can derive the first 2D plan for the base layer as described above for block 610.

Once the first 2D layer is complete/full as described above, thereby forming the base layer, the robotic system 100 can convert the placement plan into 3D states as described for block 612/652. Using the 3D information, the robotic system 100 can identify one or more planar sections/areas (e.g., the placement surfaces 352-356 of FIG. 3B) of the base layer as described above. Using the planar sections, the robotic system 100 can iteratively/recursively derive package placements for the next layer above the base layer. The robotic system 100 can consider each of the planar sections as new instances of the discretized platform models 304 and test/evaluate different placements as described above for block 610. In some embodiments, the robotic system 100 can derive the 2D placements using the placement surfaces but calculate the score across the entirety of the placement pallet 340. Accordingly, the robotic system 100 can be configured to follow preferences for larger placement areas for subsequent layers without being limited to the preceding placement areas.

Once the iterative placement process stops for the second layer, the robotic system 100 can calculate planar sections (e.g., top surfaces having heights within a threshold range) for the derived layer to generate the 2D placements of the remaining packages/groupings for the next above layer. The iterative layering process can continue until the stopping condition has been met as described above.

In some embodiments, the robotic system 100 can separately generate 2D plans (e.g., two or more of the placement plans 350) at block 612. The robotic system 100 can generate the stacking plan 502 based on vertically combining (e.g., arranging/overlapping the 2D placement plans along a vertical direction) the 2D plans.

At block 614, the robotic system 100 can calculate a packing sequence (e.g., the stacking sequence 530 of FIG. 5B) based on the stacking plan 502. As an example, the packing sequence can be for identification of the placing order of the available packages 362. In some embodiments, as illustrated at block 662, the robotic system 100 can calculate the packing sequence layer-by-layer. In other words, the robotic system 100 can calculate the packing sequence for each layer and then connect the sequences according to the order/position of the layers from bottom to top. In calculating the packing sequence, in some embodiments, the robotic system 100 can adjust the placement plans as illustrated at block 672. For example, the robotic system 100 can adjust the placement plans by reassigning one or more of the packages (e.g., packages with heights that increase the collision probabilities for subsequent manipulations/transfers) from a lower-layer placement plan to a higher-layer placement plan. Any packages supported by the reassigned package can also be reassigned to a further higher layer. In other words, the reassigned packages can remain at the same horizontal placement and be associated with a higher layer, such that the packages can be placed later as illustrated in FIG. 5B. At block 674, the robotic system 100 can calculate the packing sequence (e.g., the stacking sequence 530) based on the adjusted placement plan, such as by packing/manipulating objects that are assigned in the higher layers after the objects assigned in the lower layers.

In other embodiments, as illustrated at block 664, the robotic system 100 can calculate the packing sequence regardless/independent of the layer assignments. In other words, the robotic system 100 can calculate the packing sequence such that packages assigned to a lower layer may be placed after packages assigned to a higher layer.

In calculating the packing sequence, both within or across layers, the robotic system 100 can analyze the locations of the packages in the stacking plan 502 according to one or more package dimensions (e.g., heights), relative placement locations, or a combination thereof. For example, the robotic system 100 can sequence placements of boxes further away from a unit/reference location (e.g., location of the palletizing robot) before closer assigned packages. Also, the robotic system 100 can place the taller/heavier packages earlier when their assigned locations are along the perimeters of the placement plan and away from the unit location.

At block 616, the robotic system 100 can implement the stacking plan 502 for placing the available packages 362 on the platform. The robotic system 100 can implement the stacking plan 502 based on communicating one or more motion plans, actuator commands/settings, or a combination thereof to the corresponding device/unit (e.g., the transfer unit 104 of FIG. 1, the actuation devices 212 of FIG. 2, the sensors 216 of FIG. 2, etc.) according to the stacking plan 502. The robotic system 100 can further implement the stacking plan 502 based on executing the communicated information at the devices/units to transfer the available packages 362 from a source location to the destination platform. Accordingly, the robotic system 100 can place the available packages 362 according to the 3D mapping, where one or more of the available packages 362 are placed/stacked on top of other packages, such as placing the available packages 362 layer-by-layer. Further, the robotic system 100 can manipulate/transfer the packages according to the packing sequence. As such, the robotic system 100 can place the packages layer-by-layer or without such restrictions as described above.

Discretization of the tasks and the 2D/3D layering described above provides improved efficiency, speed, and accuracy for packing objects. Accordingly, the reduction in operator inputs and the increase in accuracy can further decrease human labor for the automated packing process. In some environments, the robotic system 100 as described above can eliminate the necessity of sequencing buffers, which can cost around or over $1 million US.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the invention is not limited, except as by the appended claims. In general, the terms used in the following claims should not be construed to limit the disclosed technology to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method for operating a robotic system, the method comprising:
   calculating a processing order for subgroupings that represent groupings of available objects designated for placement at a task location;
   based at least in part on the subgroupings and the processing order, generating placement plans for placing the available objects, wherein generating the placement plans includes comparing arrangements of discretized object models for the available objects to a discretized platform model corresponding to the task location, wherein the discretized object models correspond to physical dimensions of the available objects, and wherein the discretized platform model corresponds to physical dimensions of a platform at the task location;
   based at least in part on the placement plans, generating a stacking plan for stacking the available objects, wherein the placement plans correspond to layers within the stacking plan; and
   implementing the stacking plan for placing the available objects at the task location.

2. The method of claim 1, wherein:
   the method further comprises calculating a packing sequence for identifying a placing order of the available objects; and
   implementing the stacking plan includes implementing the stacking plan according to the packing sequence.

3. The method of claim 2, wherein:
   calculating the packing sequence includes:
      adjusting the placement plans by reassigning a placement location, representing placement of one or more of the available objects, from a lower-layer placement plan to a higher-layer placement plan, and
      calculating the packing sequence for each placement plan; and
   implementing the stacking plan further includes implementing the stacking plan for placing the available objects layer-by-layer.

4. The method of claim 2, wherein calculating the packing sequence includes analyzing the stacking plan according to height measurements for the available objects; and/or placement locations representing planned placement of the available objects relative to a unit location.

5. The method of claim 1, further comprising determining the subgroupings of the available objects according to specified priorities, fragility ratings, object weight ranges, heights, and/or object types.

6. The method of claim 1, wherein calculating the processing order includes prioritizing the subgroupings according to a number of objects therein, a combined horizontal area, weight ranges, and/or fragility ratings.

7. The method of claim 6, wherein calculating the processing order includes calculating the processing order for an initial set representing the available objects before implementing the stacking plan.

8. The method of claim 6, wherein calculating the processing order includes calculating the processing order for a remaining set representing the available objects yet to be placed after or while implementing the stacking plan.

9. The method of claim 1, wherein:
   generating the placement plans includes:
      identifying object types representing a grouping condition for the available objects; and
      iteratively deriving placement locations representing planned placements for each of the available objects based at least in part on:
         determining an initial placement location for one of the object types, and
         deriving candidate placement locations representing planned placements for a next object based on one or more placement conditions; and
   the placement plans each represent a unique placement combination of the initial placement location and the candidate placement locations of one or more of the available objects.

10. The method of claim 9, wherein the one or more placement conditions include object dimensions, collision probabilities, fragility ratings, object weight ranges, separation requirements, and/or object quantity conditions.

11. The method of claim 9, wherein iteratively deriving the placement locations further includes:
- tracking the placement plans across iterations;
- calculating placement scores for the placement plans according to the one or more placement conditions; and
- sequencing the placement plans according to the placement scores.

12. The method of claim 11, wherein tracking the placement plans includes:
- generating and updating a search tree including the placement plans; and
- stopping the iterations based on determining an empty source status or an unchanged score status.

13. The method of claim 9, wherein the candidate placement locations are within a threshold distance from the initial placement location of the one of the object types along a horizontal direction.

14. The method of claim 1, wherein generating the stacking plan includes generating the stacking plan according to stacking rules regarding a measure of:
- an overlap between a top object and a support object,
- an overhang of the top object over the support object,
- a center-of-mass (CoM) location of the top object relative to one or more support objects,
- a separation distance between two or more support objects, and/or
- a difference in heights of two or more support objects.

15. The method of claim 1, wherein:
- generating the placement plans and generating the stacking plan include deriving candidate stacking scenarios;
- each candidate stacking scenario is recursively or iteratively derived based at least in part on:
  - generating a lower plan for forming a lower layer,
  - identifying one or more planar sections of a first candidate plan, wherein each planar section represents adjacent and/or continuous horizontal top surfaces,
  - generating an upper plan for a layer above the lower layer based at least in part on testing one or more placement locations of remaining subgroupings relative to the one or more planar sections,
  - calculating a placement score for the candidate stacking scenario based at least in part on a number representing placed objects, and
  - stopping the iterations or the recursions based at least in part on determining an empty source status, a full layer status, or an unchanged score status; and
- generating the stacking plan includes generating the stacking plan based on selecting one of the candidate stacking scenarios according to the placement score.

16. A robotic system comprising:
- at least one processor; and
- at least one memory device communicatively connected to the at least one processor and having stored thereon instructions that, when executed by the at least one processor, cause the robotic system to:
  - calculate a processing order for subgroupings of available objects designated for placement at a task location;
  - based at least in part on the subgroupings and the processing order, generate placement plans for positioning the available objects, wherein generating the placement plans includes comparing arrangements of discretized object models for the available objects to a discretized platform model corresponding to the task location, wherein the discretized object models correspond to physical dimensions of the available objects, and wherein the discretized platform model corresponds to physical dimensions of a platform at the task location; and
  - based at least in part on the placement plans, generate a stacking plan for stacking the available objects, wherein the stacking plan includes the placement plans; and
  - implement the stacking plan for placing the available objects at the task location.

17. A tangible, non-transient computer-readable medium having processor instructions stored thereon, when executed by one or more processors of a robotic system, for causing the robotic system to implement a method, the method comprising:
- calculating a processing order for subgroupings that represent groupings of available objects designated for placement at a task location;
- based at least in part on the subgroupings and the processing order, generating a placement plan for placing the available objects, wherein generating the placement plan includes comparing arrangements of discretized object models for the available objects to a discretized platform model corresponding to the task location, wherein the discretized object models correspond to physical dimensions of the available objects, and wherein the discretized platform model corresponds to physical dimensions of a platform at the task location;
- based at least in part on the placement plan, generating a stacking plan, wherein the placement plan corresponds to at least one layer within the stacking plan; and
- implementing the stacking plan for placing the available objects at the task location.

18. The tangible, non-transient computer-readable medium of claim 17, wherein:
- the method further comprises, calculating a packing sequence for identifying a placing order of the available objects; and
- implementing the stacking plan includes implementing the stacking plan according to the packing sequence.

19. The tangible, non-transient computer-readable medium of claim 18, wherein:
- the method further comprises determining the subgroupings of the available objects according to specified priorities, fragility ratings, object weight ranges, heights, and/or object types;
- calculating the processing order includes prioritizing the subgroupings according to a number of objects represented therein, a combined horizontal area, the object weight ranges, and/or the fragility ratings; and
- generating the placement plan includes:
  - identifying object types representing a grouping condition for the available objects, and
  - iteratively deriving placement locations representing planned placement for objects of the available objects based at least in part on:
    - determining an initial placement location for one of the object types;
    - deriving candidate placement locations for a next item based on one or more placement conditions; and
    - sequencing the placement plan according to the one or more placement conditions.

20. The tangible, non-transient computer-readable medium of claim 18, wherein:
generating the placement plan and generating the stacking plan include:
converting the placement plan into at least one state based on height information for objects added in the placement plan, and
calculating at least one placement score for the placement plan based on the at least one state and at least one placement preference or criteria; and
generating the stacking plan further includes generating the stacking plan based at least in part on selecting the placement plan according to the at least one placement score.

* * * * *